United States Patent
Ishiguro et al.

(10) Patent No.: US 12,249,134 B2
(45) Date of Patent: Mar. 11, 2025

(54) VISUALIZATION METHOD, PROGRAM FOR THE SAME, VISUALIZATION DEVICE, AND DISCRIMINATION DEVICE HAVING THE SAME

(71) Applicant: ROXY CORP., Aichi (JP)

(72) Inventors: Takayuki Ishiguro, Nagoya (JP); Hitoshi Hoshino, Nagoya (JP)

(73) Assignee: ROXY CORP., Aichi (JP)

( * ) Notice: Subject to any disclaimer, the term of this patent is extended or adjusted under 35 U.S.C. 154(b) by 378 days.

(21) Appl. No.: 17/907,135

(22) PCT Filed: Apr. 1, 2021

(86) PCT No.: PCT/JP2021/014131
§ 371 (c)(1),
(2) Date: Sep. 23, 2022

(87) PCT Pub. No.: WO2021/210414
PCT Pub. Date: Oct. 21, 2021

(65) Prior Publication Data
US 2023/0103374 A1   Apr. 6, 2023

(30) Foreign Application Priority Data
Apr. 17, 2020 (JP) .................. 2020-073810

(51) Int. Cl.
*G06V 10/00* (2022.01)
*G06V 10/77* (2022.01)
(Continued)

(52) U.S. Cl.
CPC ............ *G06V 10/86* (2022.01); *G06V 10/771* (2022.01); *G06V 10/7715* (2022.01); *G06V 10/82* (2022.01)

(58) Field of Classification Search
CPC .... G06V 10/454; G06V 10/86; G06V 10/771; G06V 10/7715; G06V 10/82; G06T 7/00; G06N 20/00; G06N 20/10
See application file for complete search history.

(56) References Cited

U.S. PATENT DOCUMENTS 6,741,756 B1 * 5/2004 Toyama ............... G06V 40/161
                                                            382/159
7,433,493 B1   10/2008 Miyoshi et al.
(Continued)

FOREIGN PATENT DOCUMENTS

JP   S61-156389 A   7/1986
JP   2001-250101 A   9/2001
(Continued)

OTHER PUBLICATIONS

International Search Report issued in PCT/JP2021/014131; mailed Jun. 29, 2021.

*Primary Examiner* — Amir Alavi
(74) *Attorney, Agent, or Firm* — Studebaker Brackett PLLC

(57) ABSTRACT

The second multi-dimensional feature vectors 92a of sample image data 34a having instruction signals that are converted by a feature converter 27 are read in (Step S10), two-dimensional graph data for model 36a is generated based on the read second multi-dimensional feature vectors 92a to be stored (Step S12), two-dimensional model graphs Og and Ng are generated based on the generated two-dimensional graph data for model 36a, to be displayed on the window 62 (Step S14). The second multi-dimensional feature vectors 92a are indicators appropriate for visualization of the trained state (individuality) of a trained model 35. Thus, it is possible to visually check and evaluate whether the trained model 35 is in an appropriately trained state (individuality) or not.

25 Claims, 16 Drawing Sheets

(51) Int. Cl.
*G06V 10/771* (2022.01)
*G06V 10/82* (2022.01)
*G06V 10/86* (2022.01)

(56) References Cited

U.S. PATENT DOCUMENTS

| | | | | |
|---|---|---|---|---|
| 9,098,911 | B2* | 8/2015 | Wu | H04N 13/261 |
| 10,068,494 | B2* | 9/2018 | Ahmad | G09B 19/0092 |
| 10,410,348 | B2* | 9/2019 | Han | G06T 7/11 |
| 10,782,691 | B2* | 9/2020 | Suresh | G06V 10/95 |
| 10,810,996 | B2* | 10/2020 | Willett | G10L 25/03 |
| 11,736,756 | B2* | 8/2023 | Vats | G06T 13/40 |
| | | | | 345/473 |
| 11,842,540 | B2* | 12/2023 | Ben Yahia | G06V 20/46 |
| 11,853,882 | B2* | 12/2023 | Huang | G06N 3/08 |
| 12,051,004 | B2* | 7/2024 | Park | G06N 3/045 |
| 2017/0262736 | A1 | 9/2017 | Yu et al. | |
| 2018/0268220 | A1 | 9/2018 | Lee et al. | |
| 2019/0371439 | A1 | 12/2019 | Lisowska et al. | |
| 2020/0234051 | A1 | 7/2020 | Lee et al. | |
| 2022/0100988 | A1* | 3/2022 | Yamamoto | G06V 40/172 |
| 2023/0103374 | A1* | 4/2023 | Ishiguro | G06V 10/82 |
| | | | | 382/155 |

FOREIGN PATENT DOCUMENTS

| | | |
|---|---|---|
| JP | 2019-507935 A | 3/2019 |
| JP | 2019-211288 A | 12/2019 |
| JP | 2019-212296 A | 12/2019 |
| WO | 2002/21441 A1 | 3/2002 |
| WO | 2018/170421 A1 | 9/2018 |

* cited by examiner

VISUALIZATION METHOD, PROGRAM FOR THE SAME, VISUALIZATION DEVICE, AND DISCRIMINATION DEVICE HAVING THE SAME

BACKGROUND

Field of the Invention

The present invention relates to a visualization method for visualizing the trained state of a model that has been trained with a plurality of sample data, programs for causing one or a plurality of computers to perform the steps of the visualization method, a visualization device for visualizing the trained state of a model that has been trained with a plurality of sample data, and a discrimination device for discriminating the class of an object.

Description of the Related Art

Japanese Patent Application Publication No. 2019-211288 (Patent Document 1) describes a discrimination device which extracts the features from an image of an object using a convolutional neural network, performs a multivariate analysis on the extracted features, and discriminates the class of the object based on the results of the multivariate analysis.

The discrimination device is configured to classify a wide variety of objects with high accuracy and to easily set a threshold value for discrimination of the class, in consideration of the objects additional values such as luxury and versatility, so as to set discrimination references based on the results of the multivariate analysis the objects.

PRIOR ART DOCUMENTS

Patent Documents

[Patent Document 1] Japanese Patent Application Publication No. 2019-211288

SUMMARY

Problems to be Solved

Generally, the evaluation of a trained model generated by using a feature extractor including a convolutional neural network is performed by one-dimensional numerical indicators such as an accuracy rate, a precision rate, and a recall rate. These numerical indicators are based on the discrimination results of the sample data for training, and thereby a large amount of sample data without bias has been required to generate an appropriately trained model. However, intensive research conducted by the inventors of the present invention has revealed that even if trained models show the same numerical indicators with each other, the manners to calculate the discrimination results vary between the models depending on the trained states. That is, it was found that if the trained state (individuality) of a trained model can be recognized, it is possible to generate an appropriately trained model with a small number of sample data. The above-mentioned publication does not mention any of these points, and there is still room for improvement in generating an appropriately trained model easily and rapidly.

The present invention has been made in view of the above, and one of the objectives of the present invention is to provide a technique that contributes to the simple and rapid generation of an appropriately trained model. Another objective is to provide a technique that contributes to improving the reliability of a model and the accuracy in discrimination of the trained model.

Means for Solving the Problems

According to a preferred embodiment of a visualization method of the present invention, a visualization method for visualizing the trained state of a model that has been trained with a plurality of sample data is configured. The visualization method includes: (a) in order to generate the trained model, extracting first multi-dimensional feature vectors of each of the plurality of sample data by a feature extractor, (b) converting the extracted first multi-dimensional feature vectors to second multi-dimensional feature vectors of a lower dimension than the first multi-dimensional feature vectors by a feature converter that uses a plurality of fully connected layers; (c) graphing the converted second multi-dimensional feature vectors of each of the plurality of sample data; and (d) displaying a plurality of generated graphs in a first section of a display unit.

According to the present invention, when a trained model is generated, the trained state of the trained model, that is, the second multi-dimensional feature vectors effective for visualizing the individuality of the trained model are graphed, and the graphs are displayed in the first section of the display unit. As such, the trained state (individuality) of the trained model can be easily visualized. With the configuration, it is possible to evaluate whether the trained model is in a trained state to properly discriminate the class of an object, and thereby an appropriately trained model can be generated with a smaller number of sample data than in the past. Thus, an appropriately trained model can be generated easily and rapidly. Needless to say, the trained state (individuality) of the trained model can be visually checked, which enhances the reliability of the trained model. Further, since an appropriately trained model can be generated, the threshold value used for appropriate classification of an object can be widely set. As a result, erroneous discriminations can be decreased which are caused by disturbances including the adverse effects of external light used to obtain an image of an object, leading to the stable acquisition of accurate discrimination results.

According to another embodiment of the visualization method of the present invention, in the step (d), in the plurality of graphs, identical or similar graphs are displayed in an identical or similar style to each other, and dissimilar graphs are displayed in different styles from each other. Here, the "identical or similar graphs" in the present invention correspond to the graphs in which instruction signals given to the sample data are identical or similar to each other. Further, the "displayed in an identical or similar style" in the present invention typically corresponds to the style of displaying in the same color or similar colors, and preferably encompasses the styles of displaying in an identical line width or an identical line type (e.g., displayed in solid lines, displayed in broken lines, displayed in one-dot chain lines, or displayed in two-dot chain lines). Further, the "displayed in different styles" in the present invention typically corresponds to the styles of displaying in different colors and dissimilar colors, and preferably encompasses the styles of displaying in different line widths or different line types (e.g., displayed in a combination of solid line and broken line, solid line and one-dot chain line, or solid line and two-dot chain line).

According to the present embodiment, the trained state (individuality) of a trained model can be displayed visually clearer.

According to another embodiment of the visualization method of the present invention, in the step (c), the second multi-dimensional feature vectors are plotted into a two-dimensional graph as a set of features for the number of dimensions. Here, the "two-dimensional graph" in the present invention typically corresponds to a graph that can be drawn on a plane. Examples of the graph that can be drawn on a plane include a graph in a Cartesian coordinate system, and preferably encompass a graph in a polar coordinate system.

According to the present embodiment, the second multi-dimensional feature vectors can be easily graphed.

According to another embodiment of the visualization method of the present invention, the step (a) includes a step of extracting third multi-dimensional feature vectors of an object by the feature extractor, in order to classify the object. The step (b) includes a step of converting the extracted third multi-dimensional feature vectors into fourth multi-dimensional feature vectors of a lower dimension than the third multi-dimensional feature vectors by the feature converter. The step (c) includes a step of graphing the fourth multi-dimensional feature vectors. The step (d) includes a step of displaying a graph of the fourth multi-dimensional feature vectors in the first section in a style different from the styles of the plurality of graphs. Here, the "object" in the present invention typically corresponds to an object whose class is unknown, and preferably includes an object whose class is known, for example, the sample data arbitrarily extracted from a plurality of sample data used in a training, so as to verify the training results of a trained model and improve the training accuracy.

According to the present embodiment, when an object is classified, the discrimination result of the class of the object can be visualized in addition to the visualization of the trained state (individuality) of the trained model. Note that, since the graph of the fourth multi-dimensional feature vectors for the object is displayed in a style different from those of the plurality of graphs (the graphs of the second multi-dimensional feature vectors), which facilitates the check of the discrimination result of the class of the object.

According to another embodiment of the visualization method of the present invention, in the step (c), the fourth multi-dimensional feature vectors are plotted into a two-dimensional graph as a set of features for the number of dimensions. Here, the "two-dimensional graph" in the present invention typically corresponds to a graph that can be drawn on a plane. Examples of the graph that can be drawn on a plane include a graph in a Cartesian coordinate system, and preferably encompass a graph in a polar coordinate system.

According to the present embodiment, the fourth multi-dimensional feature vectors can be easily graphed.

Another embodiment of the visualization method according to the present invention further includes a step (e) of displaying an image of the object in a second section of the display unit, and a step (f) of designating an area of the image of the object. The step (a) includes a step of extracting fifth multi-dimensional feature vectors in the designated area by the feature extractor. The step (b) includes a step of converting the extracted fifth multi-dimensional feature vectors into sixth multi-dimensional feature vectors of a lower dimension than the fifth multi-dimensional feature vectors by the feature converter. The step (c) includes a step of graphing the sixth multi-dimensional feature vectors. The step (d) includes a step of displaying a graph of the sixth multi-dimensional feature vectors in the first section in a style different from the styles of the plurality of graphs.

According to the present embodiment, the discrimination result of the class of an area of an object can be visualized. Thus, the user can visually check the discrimination result of the portion which concerns the user, and also can repeat the training depending on the discrimination result of the portion. As a result, the reliability of a trained model and the accuracy of discrimination can be improved. Note that, while the second section of the display unit is being used to designate an image area of an object, the first section of the display unit can be used to check the discrimination result of the class of the area, and thereby the operation is easy. Further, since the graph of the sixth multi-dimensional feature vectors in an area is displayed in a style different from those of the plurality of graphs (the graphs of the second multi-dimensional feature vectors), which facilitates the check of the discrimination result of the class of the area.

Another embodiment of the visualization method according to the present invention further includes a step (g) of selecting a graph similar to the graph of the sixth multi-dimensional feature vectors from the plurality of graphs. The step (d) includes a step of displaying, in the first section, the graph similar to the graph of the sixth multi-dimensional feature vectors in the plurality of graphs, in a style different from the styles of the plurality of graphs and the graph of the sixth multi-dimensional feature vectors. Here, the "graph similar to" of the present invention corresponds to a graph of the second multi-dimensional feature vectors at the shortest distances from the sixth multi-dimensional feature vectors.

According to the present embodiment, as well as the graph of the sixth multi-dimensional feature vectors, the graph of the second multi-dimensional feature vectors similar to the said graph is displayed in the first section in a style different from those of the plurality of graphs (the graph of the second multi-dimensional feature vectors) and the graph of the sixth multi-dimensional feature vectors. Thus, whether or not the trained model has been appropriately trained can be visually checked, in addition to whether or not the object has been properly classified. That is, when the graph of the sixth multi-dimensional feature vectors for an area of an object whose class is known is displayed in the first section, the trained state of the trained model can be recognized to be inappropriate if the graphs of the second multi-dimensional feature vectors of the sample data displayed in the first section as being similar to the graph are displayed in a class region or in a shape different from the graph of the sixth multi-dimensional feature vectors for the area of the object whose class is known. Needless to say, the trained state of the trained model can be recognized to be appropriate when the graph of the second multi-dimensional feature vectors of the sample data, which is displayed in the first section as being similar to the graph of the sixth multi-dimensional feature vectors for the area of the object whose class is known, is displayed in a class region identical to and in a shape similar to the graph of the sixth multi-dimensional feature vectors for an area of the object whose class is known.

Another embodiment of the visualization method according to the present invention further includes a step (h) of setting a reference value based on the predetermined second multi-dimensional feature vectors, a step (i) of calculating the differences between the sixth multi-dimensional feature vectors and the reference value as one-dimensional numerical values, and a step (j) of notifying of the calculated differences in a visual and/or auditory and/or tactile mode.

According to the present embodiment, similarity of an area to the reference value can be checked visually and/or auditorily and/or tactilely.

According to another embodiment of the visualization method of the present invention, in the step (c), the sixth multi-dimensional feature vectors are plotted into a two-dimensional graph as a set of features for the number of dimensions. Here, the "two-dimensional graph" in the present invention typically corresponds to a graph that can be drawn on a plane. Examples of the graph that can be drawn on a plane include a graph in a Cartesian coordinate system, and preferably encompass a graph in a polar coordinate system.

According to the present embodiment, the sixth multi-dimensional feature vectors can be easily graphed.

According to another embodiment of the visualization method of the present invention, the feature extractor and the feature converter are trained with a neural network that includes deep learning. The neural network may be deep metric learning, for example.

According to the present embodiment, a trained model can be effectively visualized. Thereby, the discrimination accuracy can be further enhanced.

According to a preferred embodiment of a program of the present invention, a program for visualizing the trained state of a model that has been trained with a plurality of sample data is configured. The program causes one or more computers to perform the steps of the visualization method according to any one of the above embodiments of the present invention. The program may be stored on a computer-readable recording medium such as a hard disk, ROM, SSD, flash memory (e.g., USB memory and SD card), floppy disk, CD, and DVD. The program also may be delivered from one computer to another via a transmission medium, such as a communication network including the Internet and LAN. The program may be delivered and received in any other manner.

According to the present embodiment, the steps of the visualization method according to any one of the above embodiments of the present invention are performed by a single computer that executes the program alone or by a plurality of computers that share and perform the steps of the program. Thus, the same effects of the visualization method according to the present invention can be provided: for example, since it is possible to evaluate whether or not a trained model is in a trained state to appropriately discriminate the class of an object, an appropriately trained model can be generated with a smaller number of sample data and the appropriately trained model can be generated more easily and rapidly than before; the reliability of a trained model can be improved; and also a proper trained model is available to stably obtain an accurate discrimination result.

According to a preferred embodiment of a visualization device of the present invention, a visualization device for visualizing a trained state of a model that has been trained with a plurality of sample data is configured. The visualization device includes: a feature extractor configured to extract first multi-dimensional feature vectors of each of the plurality of sample data in order to generate the trained model; a feature converter configured to convert the extracted first multi-dimensional feature vectors to second multi-dimensional feature vectors of a lower dimension than the first multi-dimensional feature vectors by using a plurality of fully connected layers; a graph generation unit configured to generate a plurality of first graph data for graphing the second multi-dimensional feature vectors of each of the plurality of converted sample data; and a display unit including a first section for displaying a plurality of graphs based on the plurality of generated first graph data.

According to the present embodiment, in order to generate a trained model, the trained state of the trained model, that is, the second multi-dimensional feature vectors which are effective for visualizing the individuality of the trained model, are graphed and the graph is displayed in the first section of the display unit. With this configuration, the trained state (individuality) of the trained model can be easily visualized, and thereby it is possible to evaluate whether or not the trained model is in a trained state that allows appropriate classification of an object. As such, an appropriately trained model can be generated with a smaller number of sample data than before. As a result, an appropriately trained model can be generated easily and rapidly. Needless to say, the trained state of the trained model can be visually checked, enhancing the reliability of the trained model. Further, since an appropriately trained model can be generated, the threshold value used for the appropriate classification of an object can be widely set. As a result, erroneous discriminations can be decreased which are caused by disturbances including the adverse effects of external light used to obtain an image of an object, leading to the stable acquisition of accurate discrimination results.

According to another embodiment of the visualization device of the present invention, the graph generation unit generates two-dimensional graph data by using the second multi-dimensional feature vectors as a set of features for the number of dimensions. Here, the "two-dimensional graph" in the present invention typically corresponds to a graph that can be drawn on a plane. Examples of the graph that can be drawn on a plane include a graph in a Cartesian coordinate system, and preferably encompass a graph in a polar coordinate system.

According to the present embodiment, the second multi-dimensional feature vectors can be easily graphed.

According to another embodiment of the visualization device of the present invention, the graph generation unit adds first identical or similar identification information to the data identical or similar to each other in the plurality of first graph data. Then, the display unit displays the plurality of graphs, in the first section, based on the plurality of first graph data having the first identification information. Here, the "identical or similar data" in the present invention correspond to the data in which instruction signals given to the sample data are identical or similar to each other. Further, the "identical or similar first identification information" in the present invention typically corresponds to the color information such as an identical color or similar colors, and preferably encompasses the size information and the line-type information: for example, identical line width or identical line type (e.g., solid line, broken line, one-dot chain line, and two-dot chain line).

According to the present embodiment, the individuality of a trained model can be displayed visually clearer.

According to another embodiment of the visualization device of the present invention, the feature extractor extracts third multi-dimensional feature vectors of an object in order to classify the object. The feature converter converts the extracted third multi-dimensional feature vectors into fourth multi-dimensional feature vectors of a lower dimension than the third multi-dimensional feature vectors. Further, the graph generation unit generates second graph data for graphing the fourth multi-dimensional feature vectors, and adds second identification information, which is different from the first identification information to the second graph data. The display unit displays a graph of the fourth multi-dimensional feature vectors, in the first section, based on the second graph data having the second identification information. Here, the "object" in the present invention typically corresponds to an object whose class is unknown, and preferably encompasses an object whose class is known, for example, the sample data arbitrarily extracted from a plurality of sample data used in a training, so as to verify the training result of a trained model and improve the training accuracy.

According to the present embodiment, when an object is classified, the discrimination result of the class of the object can be visualized in addition to the visualization of the trained state (individuality) of the trained model. Note that, since the graph of the fourth multi-dimensional feature vectors for the object is displayed in a style different from those of the plurality of graphs (the graphs of the second multi-dimensional feature vectors), which facilitates the check of the discrimination result of the class of the object.

According to another embodiment of the visualization device of the present invention, the graph generation unit generates two-dimensional graph data by using the fourth multi-dimensional feature vectors as a set of features for the number of dimensions. Here, the "two-dimensional graph" in the present invention typically corresponds to a graph that can be drawn on a plane. Examples of the graph that can be drawn on a plane include a graph in a Cartesian coordinate system, and preferably encompass a graph in a polar coordinate system.

According to the present embodiment, the fourth multi-dimensional feature vectors can be easily graphed.

According to another embodiment of the visualization device of the present invention, the display unit includes a second section for displaying an image of the object and is configured to designate an area of an image of the object in the second section. The feature extractor extracts fifth multi-dimensional feature vectors in the designated area. The feature converter converts the extracted fifth multi-dimensional feature vectors into sixth multi-dimensional feature vectors of a lower dimension than the fifth multi-dimensional feature vectors. Further, the graph generation unit generates third graph data for graphing the sixth multi-dimensional feature vectors, and adds third identification information, which is different from the first identification information to the third graph data. Then, the display unit displays a graph of the sixth multi-dimensional feature vectors in the first section based on the third graph data having the third identification information. Here, the "configured to designate an area of the object" in the present invention typically correspondents to an aspect in which an area of the image displayed on the display unit is designated by clicking or dragging by a pointing device (so-called "mouse") to input the information into a computer, and preferably encompasses an aspect in which an area of the image displayed on the display unit is designated by directly touching the display unit with a finger, stylus or the like.

According to the present embodiment, while an area of the object is being designated in the second section of the display unit, the discrimination result of the class of the area can be checked in the first section of the display unit. Note that, since the graph of the sixth multi-dimensional feature vectors is displayed in a style different from those of a plurality of graphs (the graphs of the second multi-dimensional feature vectors), the discrimination result of the class of the area can be easily checked. Here, the third identification information may be any information different from the first identification information and may be identical to or different from the second identification information.

According to another embodiment of the visualization device of the present invention, a selection unit is further included that is configured to select fourth graph data similar to the third graph data from the plurality of first graph data and add fourth identification information different from the first and second identification information to the selected fourth graph data. The display unit displays a graph similar to the graph of the sixth multi-dimensional feature vectors, in the first section, based on the fourth graph data having the fourth identification information. Here, the "fourth graph data similar to the third graph data" corresponds to the fourth graph data for generating a graph of the second multi-dimensional feature vectors at the shortest distances from the sixth multi-dimensional feature vectors based on the third graph data.

According to the present embodiment, as well as the graph of the sixth multi-dimensional feature vectors, the graph of the second multi-dimensional feature vectors similar to the said graph is displayed in the first section in a style different from those of the plurality of graphs (the graph of the second multi-dimensional feature vectors) and the graph of the sixth multi-dimensional feature vector. Thus, whether or not the trained model has been appropriately trained can be visually recognized, in addition to whether or not the object has been properly classified. That is, when the graph of the sixth multi-dimensional feature vectors for an area of the object whose class is known is displayed in the first section, the trained state of the trained model is recognized to be inappropriate if the graph of the second multi-dimensional feature vectors of the sample data, which is displayed in the first section as being similar to the graph, is displayed in a class region or in a shape different from the graph of the sixth multi-dimensional feature vectors for the area of the object whose class is known. Needless to say, the trained state of the trained model is recognized to be appropriate when the graph of the second multi-dimensional feature vectors of the sample data, which is displayed in the first section as being similar to the graph of the sixth multi-dimensional feature vectors for the area of the object whose class is known, is displayed in an identical class region and in a similar shape to the graph of the sixth multi-dimensional feature vectors for the area of the object whose class is known.

According to another embodiment of the visualization device of the present invention, a notification unit is further included that is configured to set a reference value based on the predetermined second multi-dimensional feature vectors, calculate the differences between the sixth multi-dimensional feature vectors and the reference value as one-dimensional numerical values, and notify of the calculated differences in a visual and/or auditory and/or tactile mode.

According to the present embodiment, the similarity of an area to the reference value can be checked visually and/or auditorily and/or tactilely.

According to another embodiment of the visualization device of the present invention, the graph generation unit generates two-dimensional graph data by using the sixth multi-dimensional feature vectors as a set of features for the number of dimensions. Here, the "two-dimensional graph" in the present invention typically corresponds to a graph that can be drawn on a plane. Examples of the graph that can be drawn on a plane include a graph in a Cartesian coordinate system, and preferably encompass a graph in a polar coordinate system.

According to the present embodiment, the sixth multi-dimensional feature vectors can be easily graphed.

According to another embodiment of the visualization device of the present invention, the feature extractor and the feature converter are trained with a neural network that includes deep learning. The deep learning may be deep metric learning, for example.

According to the present embodiment, a trained model can be effectively visualized. Thus, the discrimination accuracy can be further improved.

According to a preferred embodiment of a discrimination device of the present invention, a discrimination device configured to discriminate the class of an object is configured. The discrimination device includes the visualization device according to any one of the above-mentioned embodiments of the present invention and a classifier that uses statistical machine training. The classifier classifies a plurality of sample data based on the second multi-dimensional feature vectors.

According to the present embodiment, the discrimination device includes the visualization device according to any one of the above-mentioned embodiments of the present invention. Thus, the same effects the visualization device according to the present invention provides can be provided: for example, since it is possible to evaluate whether or not a trained model is in a trained state to appropriately discriminate the class of an object, an appropriately trained model can be generated with a smaller number of sample data and the appropriately trained model can be generated more easily and rapidly than before; the reliability of a trained model can be improved; and also a proper trained model is available to stably obtain an accurate discrimination result. Note that a plurality of sample data can be classified while the trained state (individuality) of a trained model is being checked, and thereby the training can be appropriately performed.

According to the present invention, since the feature extractor, the feature converter, and the classifier are separate bodies, so that the discrimination accuracy of an object can be improved, and also the training of the feature extractor and the feature converter can be separately performed from the training of the classifier. That is, when the low discrimination accuracy is attributed to the low trained accuracy of the feature extractor and the feature converter, only the feature extractor and the feature converter may be further trained, and when the low discrimination accuracy is attributed to the low classification accuracy of the classifier, only the classifier may be further trained. With the configuration, the discrimination accuracy can be efficiently improved. Here, in the present invention, since the trained state (individuality) of a trained model can be visualized, it can be easily determined whether the low discrimination accuracy is attributed to the low trained accuracy of the feature extractor and the feature converter or to the low classification accuracy of the classifier.

According to another embodiment of the discrimination device according to the present invention of the embodiments which includes a visualization device for visualizing a discrimination result of the class of an object, the classifier classifies the object based on the second multi-dimensional feature vectors of each of the plurality of classified sample data and fourth multi-dimensional feature vectors.

According to the present embodiment, the classification of an object can be appropriately achieved.

According to another embodiment of the discrimination device according to the present invention of the embodiments which includes a visualization device for visualizing the discrimination result of the class of an area of an object, the classifier classifies the area of the object based on the second multi-dimensional feature vectors of each of the plurality of classified sample data and sixth multi-dimensional feature vectors.

According to the present embodiment, the classification of an area of the object can be appropriately achieved.

According to the present invention, an appropriately trained model can be easily and rapidly generated. Further, according to the present invention, the reliability and discrimination accuracy of the trained model can be improved.

DETAILED DESCRIPTION

Next, the best embodiment for carrying out the present invention is described with reference to examples.

EXAMPLES

Figure 1:
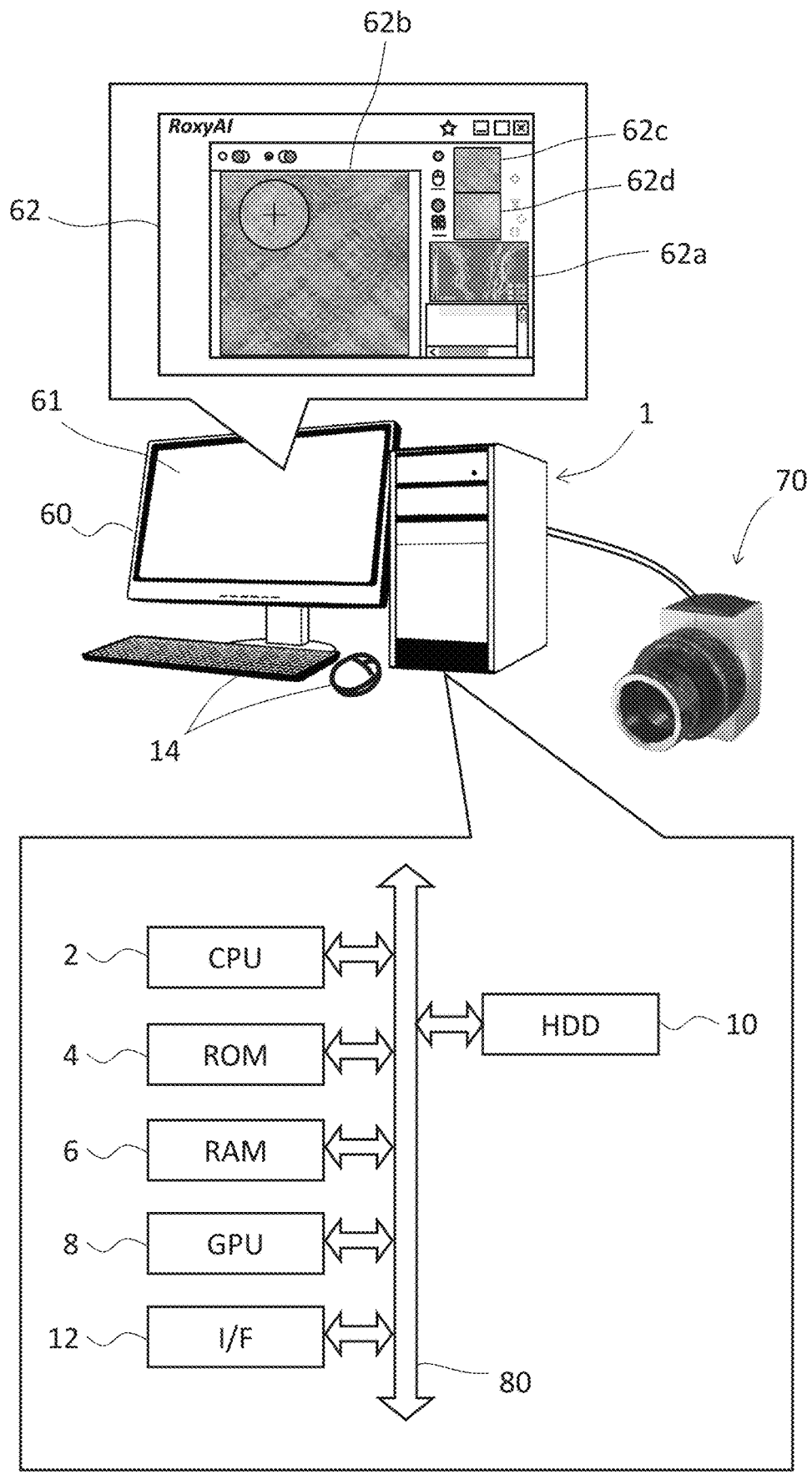
FIG. 1 is a configuration diagram showing an outline of the configuration of a computer 1 configured to function as a discrimination device according to an embodiment of the present invention.

As shown in FIG. 1, a computer 1 functions as a discrimination device according to the present embodiment and is configured as a microprocessor centered on a CPU 2. The computer 1 includes a ROM 4 for storing various processing programs, a RAM 6 for temporarily storing data, a GPU 8 for performing calculation processing and matrix calculation processing necessary for image processing, a hard disk (HDD) 10 that is large-capacity memory for storing various data including various application programs (simply referred to as applications) and image data, and an input/output interface (I/F) 12 for inputting and outputting data to and from an external device such as a camera 70. Hereinafter, for convenience, the computer 1 as a discrimination device according to the present embodiment will be described as a device for discriminating an object: whether the object is a good product or a defective product. The computer 1 is an example of an implemented configuration corresponding to the "discrimination device" in the present invention.

The computer 1 includes an input device 14 such as a keyboard and a mouse for a user to input various commands, and a display 60 for displaying various information. The CPU 2, the ROM 4, the RAM 6, the GPU 8, the HDD 10, the I/F 12, the input device 14, the display 60, and the like are electrically connected by a bus 80, and are configured to be able to send and receive various control signals and data therebetween.

The computer 1 has a function of executing an operation corresponding to an input operation when a user operates a cursor, or the like displayed on the display 60 for input via the input device 14. The computer 1 functions as a discrimination device according to the present embodiment when various processes are operated by an application stored in the HDD 10, specifically, a discrimination application for executing a processing for discriminating an object. In the present embodiment, the discrimination device is configured to be feasible by the computer 1, but it may be realized by another dedicated device.

Figure 2:
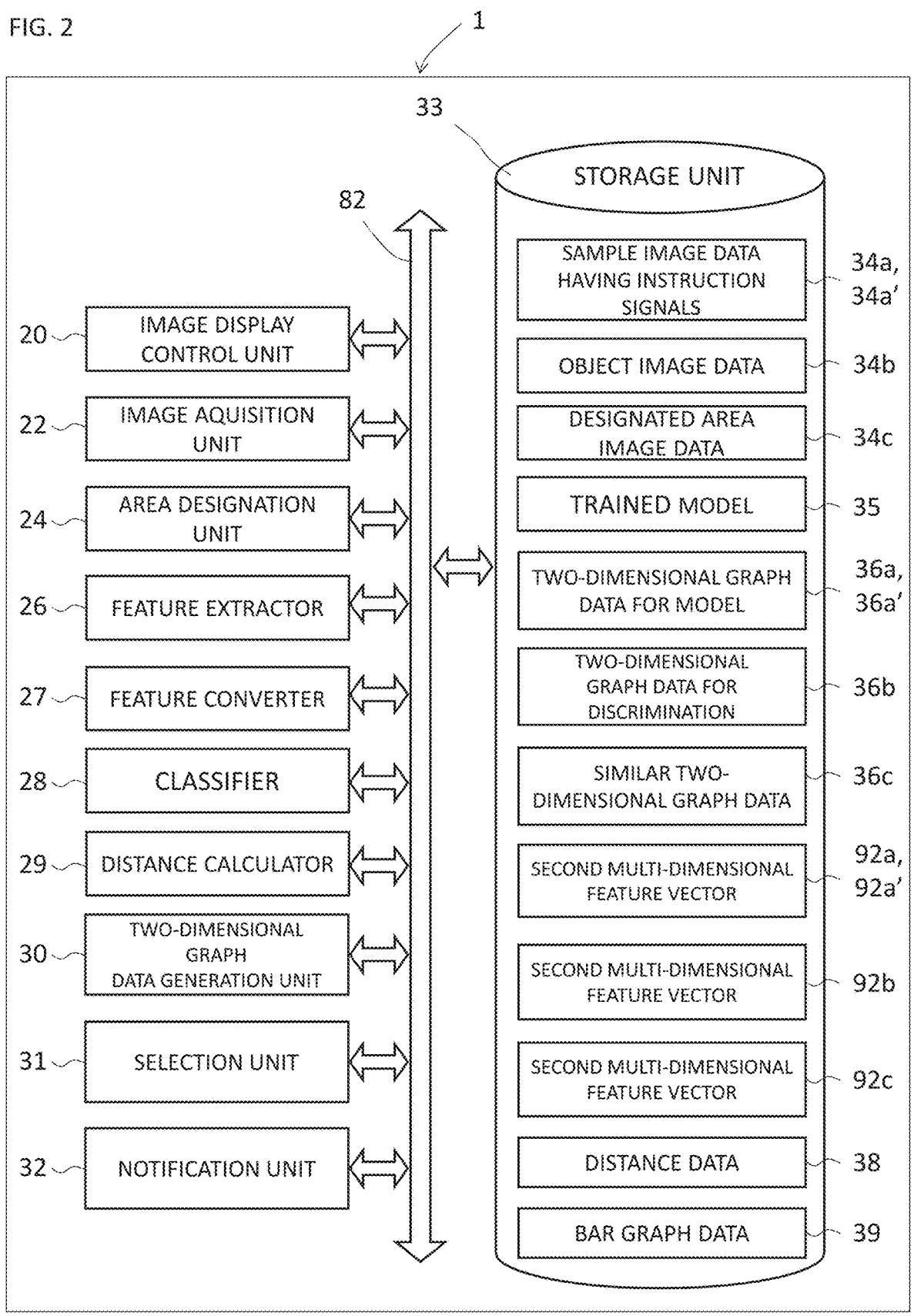
FIG. 2 is a functional block diagram showing a functional configuration of the computer 1 configured to function as a discrimination device according to an embodiment of the present invention.

As shown in FIG. 2, the computer 1 includes function blocks of an image display control unit 20, an image acquisition unit 22, an area designation unit 24, a feature extractor 26, a feature converter 27, a classifier 28, a distance calculator 29, a two-dimensional graph data generation unit 30, a selection unit 31, a notification unit 32, and a memory unit 33. These function blocks are configured with the cooperation of both or one of the above-described hardware resources and software: the hardware resources including the CPU 2, the ROM 4, the RAM 6, the GPU 8, the HDD 10, the I/F 12, the input device 14, and the display 60; and the software including the discrimination application and a visualization program according to embodiments of the present embodiment. In other words, each of these units (the image display control unit 20, the image acquisition unit 22, the area designation unit 24, the feature extractor 26, the feature converter 27, the classifier 28, the distance calculator 29, the two-dimensional graph data generation unit 30, the selection unit 31, the notification unit 32, and the memory unit 33) is a function realized by operating each of the components shown in FIG. 1 (e.g., the CPU 2, the ROM 4, the RAM 6, the GPU 8, the HDD 10, the I/F 12, the input device 14, the display 60), independently or in cooperation, based on a command from the CPU 2 to execute the applications deployed on the RAM 6 from the HDD 10. Note that the image display control unit 20, the image acquisition unit 22, the area designation unit 24, the feature extractor 26, the feature converter 27, the classifier 28, the distance calculator 29, the two-dimensional graph data generation unit 30, the selection unit 31, the notification unit 32, the memory unit 33, and the like are electrically connected by bus lines 82 such as an address bus and a data bus. The feature extractor, the feature converter 27, and the display 60 (a later-described window 62) are examples of an implemented configuration corresponding to the "visualization device" in the present invention.

When the discrimination application is started, the image display control unit 20 displays a predetermined window 62 on a screen 61 of the display 60 as shown in FIG. 1. The image display control unit 20 displays a sample image having instruction signals on the window 62, based on the sample image data 34a having instruction signals (see FIG. 2) selected by a user operating a cursor or the like displayed on the display 60 for input via the input device 14. The image display control unit 20 also displays an image of an object to be discriminated on the window 62, based on the object image data 34b (see FIG. 2) obtained by the image acquisition unit 22. The image display control unit 20 further displays a designated area image on the window 62, based on the designated area image data 34c (see FIG. 2) obtained by the area designation unit 24. The sample image data 34a having instruction signals is an example of an implemented configuration corresponding to the "a plurality of sample data" in the present invention. The display 60 and the window 62 are examples of an implemented configuration corresponding to the "display unit" in the present invention.

Also, the image display control unit 20 displays a two-dimensional graph on the window 62 based on the two-dimensional graph data for model 36a (see FIG. 2) stored in the storage unit 33. Further, the image display control unit 20 displays a two-dimensional graph for discrimination and a bar graph on the window 62 based on the two-dimensional graph data for discrimination 36b generated by the two-dimensional graph data generation unit 30 and the bar graph data 39 generated by the notification unit 32 (see FIG. 2). Furthermore, the image display control unit 20 displays, on the window 62, a discrimination result obtained by the classifier 28. Here, the sample image having instruction signals is an image used for the training of the feature extractor 26 and the feature converter 27. The object image typically corresponds to an image of an object whose class (a good product or a defective product) is unclear, and preferably encompasses an image of an object whose class (a good product or a defective product) is known, for example, a sample image having instruction signals that is arbitrarily selected by the user from the sample images having instruction signals, so as to verify the training results and to improve the training accuracy of the feature extractor 26 and the feature converter 27:

The image acquisition unit 22 acquires the sample image data 34a having instruction signals and the object image data 34b captured by the camera 70 (see FIG. 1), so as to supply the acquired image data to the image display control unit 20, the feature extractor 26, and the storage unit 33, for example.

When a sample image having instruction signals or an area of an object image displayed on the window 62 is clicked or dragged by an input operation of a user via the input device 14, the area designation unit 24 obtains the image data of the area 34c (hereinafter, referred to as "designated area image data"), so as to supply the obtained designated area image data 34c (see FIG. 2) to the image display control unit 20, the feature extractor 26, and the storage unit 33, for example.

Figure 3:
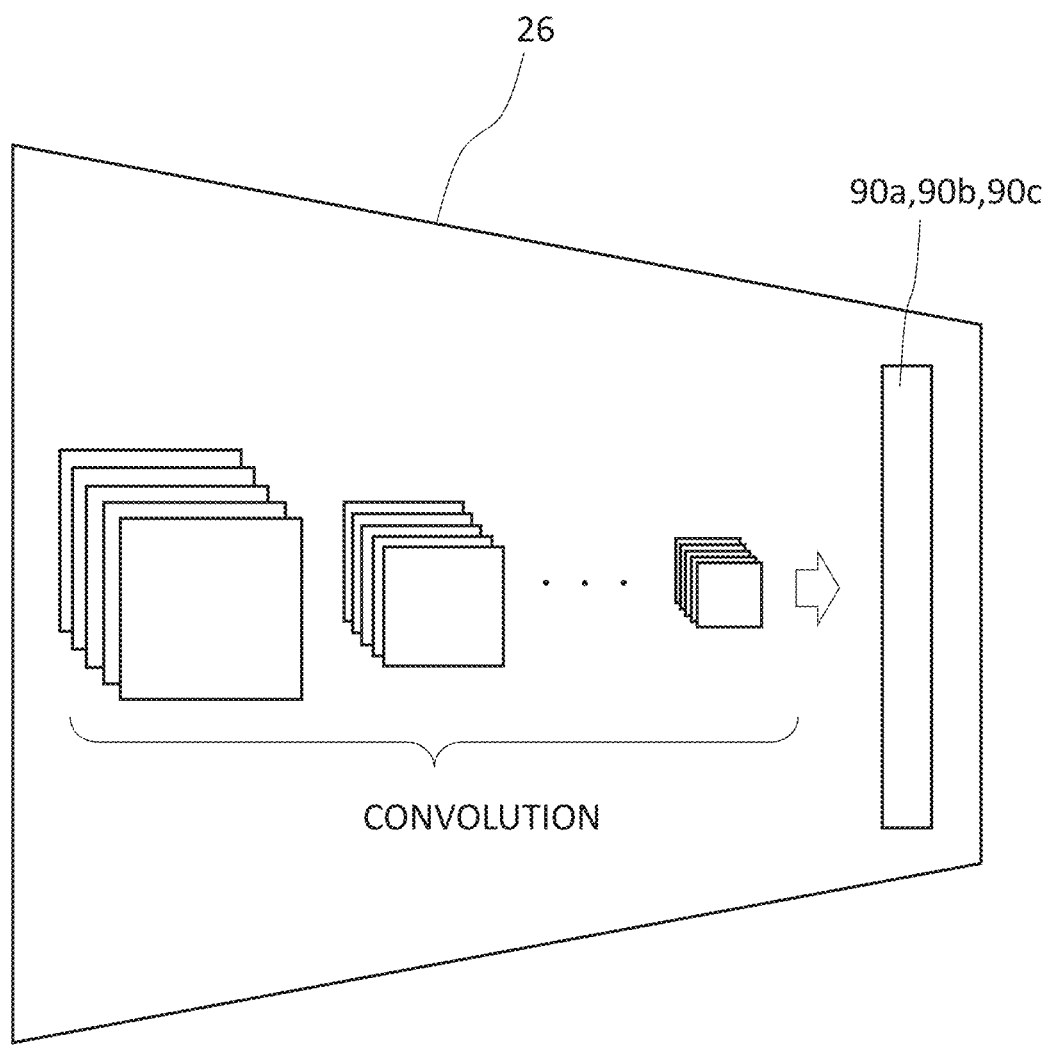
FIG. 3 is a configuration diagram showing an outline of the configuration of a feature extractor 26.
Figure 4A:
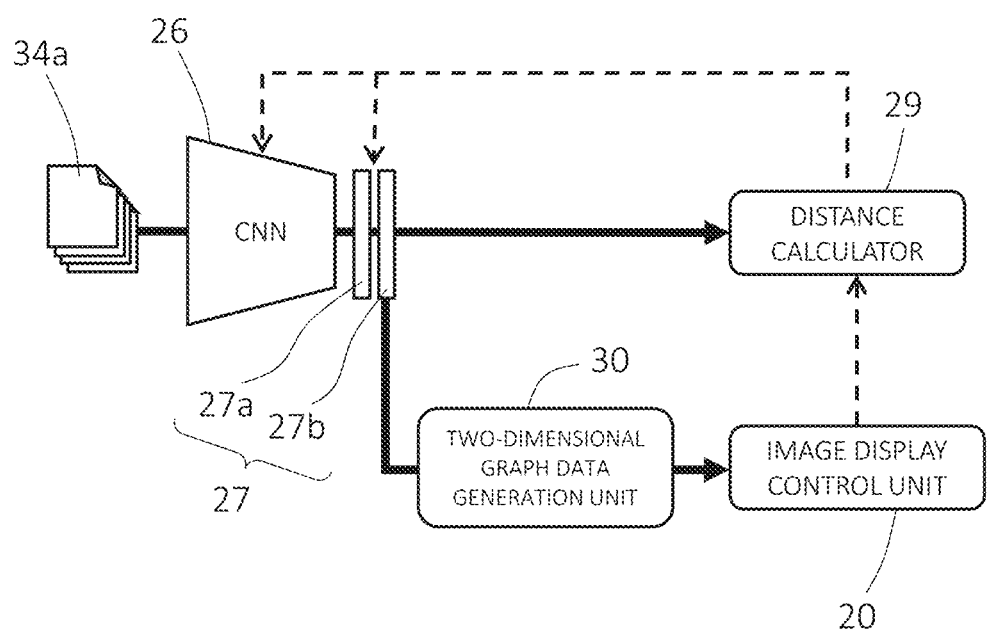
FIG. 4 is an explanatory diagram showing an outline of the generation of a trained model 35 and the classification of an object.

The feature extractor 26 extracts first multi-dimensional feature vectors 90a, 90b, 90c from the plurality of sample image data 34a having instruction signals, the object image data 34b, and the designated area image data 34c, to supply the extracted first multi-dimensional feature vectors 90a, 90b, 90c to the feature converter 27. Here, as shown in FIGS. 3 and 4, the feature extractor 26 is configured by a convolutional neural network (CNN) in the present embodiment. The first multi-dimensional feature vectors 90a, 90b, 90c are respectively the examples of an implemented configuration corresponding to the "first multi-dimensional feature vector," the "third multi-dimensional feature vector," and the "fifth multi-dimensional feature vector" in the present invention.

As shown in FIG. 3, for the extraction of the first multi-dimensional feature vectors 90a, 90b, 90c, the feature extractor 26 uses a predetermined filter (not shown) to perform a plurality of so-called convolutional processes such that the features of the plurality of sample image data 34a having instruction signals, the object image data 34b, and the designated area image data 34c are extracted from the image data 34a, 34b, 34c, without losing the features. The convolutional processes are followed by flattening the data into column vectors by the feature extractor 26.

As shown in FIG. 4, the feature converter 27 has a plurality of fully connected layers 27a and 27b, and uses the fully connected layers 27a and 27b to execute a process of reducing the dimension of the first multi-dimensional feature vectors 90a, 90b, 90c extracted by the feature extractor 26. Specifically, the feature converter 27 executes a fully connecting process so as to convert the first multi-dimensional feature vectors 90a, 90b, 90c into second multi-dimensional feature vectors 92a, 92b, 92c of a lower dimension than the first multi-dimensional feature vectors 90a, 90b, 90c, and supplies the second multi-dimensional feature vectors 92a, 92b, 92c to the classifier 28, the distance calculator 29, the two-dimensional graph data generation unit 30, and the storage unit 33. Instead of the fully connecting process, a pooling process such as Global max Pooling and Global Average Pooling may be used to convert the first multi-dimensional feature vectors 90a, 90b, 90c into second multi-dimensional feature vectors 92a, 92b, 92c of a lower dimension than the first multi-dimensional feature vectors 90a, 90b, 90c. The second multi-dimensional feature vectors 92a, 92b, 92c are individually stored in the storage unit 33. The second multi-dimensional feature vectors 92a, 92b, 92c are respectively the examples of an implemented configuration corresponding to the "second multi-dimensional feature vectors," the "fourth multi-dimensional feature vectors," and the "sixth multi-dimensional feature vectors" in the present invention.

Note that the feature extractor 26 and the feature converter 27 are trained in advance so as to obtain the first multi-dimensional feature vectors 90a, 90b, 90c and the second multi-dimensional feature vectors 92a, 92b, 92c for accurate discrimination of the class of an object, and store the obtained vectors as a trained model 35 in the storage unit 33.

Figure 4B:
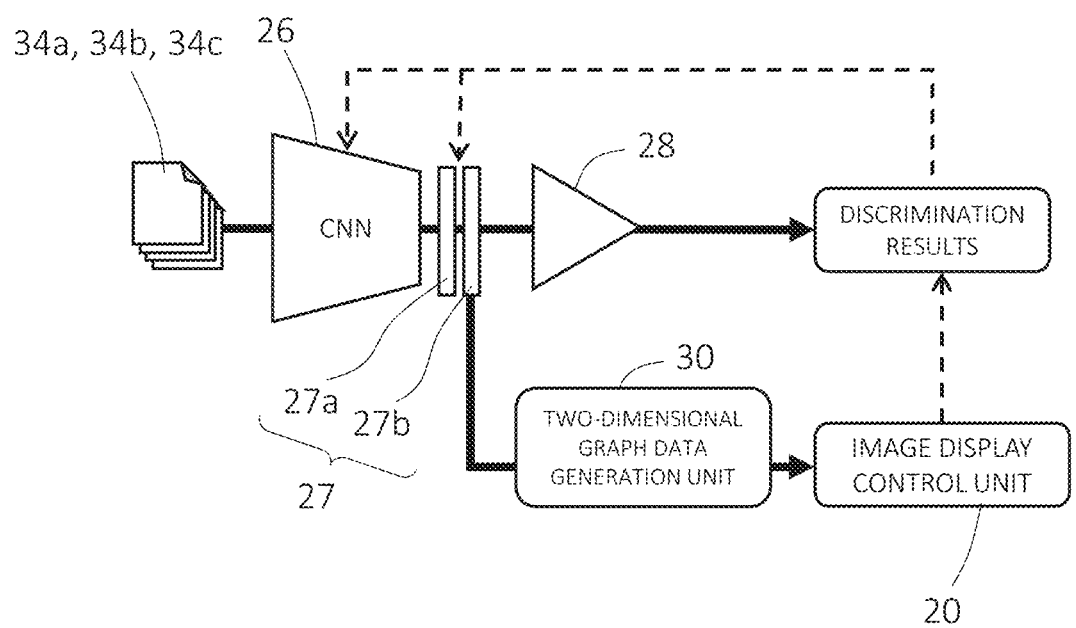

As shown in FIG. 4B, the classifier 28 functions to discriminate the class of an object. As shown in FIG. 4B, the classifier 28 classifies an object, that is, the classifier 28 discriminates the object whether it is a good product or a defective product based on the second multi-dimensional feature vectors 92a, 92b, 92c converted by the feature converter 27, and supplies the discrimination result to the image display control unit 20. In the classification of an object to be discriminated, specifically, one-dimensional numerical values indicating the certainty that the second multi-dimensional feature vectors 92a, 92b, 92c of the object represent a good product are calculated using arithmetic parameters obtained by machine-learning using the second multi-dimensional feature vectors 92a, 92b, 92c. If the one-dimensional numerical values are equal to or above a preset threshold, the object is classified as a good product, and if the one-dimensional numerical values are less than the threshold, the object is classified as a defective product. In the present embodiment, the classifier 28 is configured by a so-called statistical machine learning, such as gradient boosting, support vector machine, random forest, neural network, gaussian normalization, or ensemble inspection.

The distance calculator 29 functions to generate the trained model 35, to examine the trained model 35, and to enhance the accuracy of the trained model 35. When the trained model 35 is generated, the distance calculator 29 calculates the distances between the second multi-dimensional feature vectors 92a of a plurality of sample image data 34a having instruction signals. The distance calculator 29 then stores the calculated distances as distance data 38 in the storage unit 33. The calculated distances are fed back to the feature extractor 26 and the feature converter 27 (see FIG. 4A). When the trained model 35 is examined and the accuracy is improved, the distance calculator 29 calculates the distances between the second multi-dimensional feature vectors 92a of a plurality of sample image data 34a having instruction signals and the second multi-dimensional feature vectors 92b, 92c of the object image data 34b and the designated area image data 34c. The distance calculator 29 then stores the calculated distances as the distance data 38 in the storage unit 33.

In the present embodiment, the feedback to the feature extractor 26 and the feature converter 27 is performed as modification of the parameters of the feature extractor 26 and the feature converter 27 by an error back propagation method and a gradient descent method by using a loss function such as Triplet loss function, such that the distances between the second multi-dimensional feature vectors 92a of the good products and the distances between the second multi-dimensional feature vectors 92a of a good product and the second multi-dimensional feature vectors 92a of a defective product are relatively optimized. For such parameter modification (training of the feature extractor 26 and the feature converter 27), first, the second multi-dimensional feature vectors 92a are visualized (two-dimensionally graphed) to clear the trained state (individuality) of the trained model 35 (the feature extractor 26 and the feature converter 27), and then the modification is carried out until the trained state (individuality) reaches a desired state. In this way, the trained model 35 is generated and stored in the storage unit 33. Note that, in this embodiment, the training of the trained model 35 is synonymous with the training of the feature extractor 26 and the feature converter 27.

Here, in the present embodiment, deep metric learning is used for the modification of the parameters of the feature extractor 26 and the feature converter 27. That is, deep metric learning is used in a series of processes: in which the feature extractor 26 extracts the first multi-dimensional feature vectors 90a, and the feature converter 27 converts the extracted multi-dimensional feature vectors 90a into the second multi-dimensional feature vectors 92a, the distance calculator 29 calculates the distances between the converted multi-dimensional feature vectors 92a, and then based on the calculated distances, the parameters of the feature extractor 26 and the feature converter 27 are modified by an error back propagation method and a gradient descent method.

The details of the visualization (two-dimensional graphing) of the second multi-dimensional feature vectors 92a and the determination of whether or not the training (individuality) of the feature extractor 26 and the feature converter 27 is in a desired state will be described later.

The two-dimensional graph data generation unit 30 generates the two-dimensional graph data for model 36a based on the second multi-dimensional feature vectors 92a of the sample image data 34a having instruction signals, and also generates the two-dimensional graph data for discrimination 36b based on the second multi-dimensional feature vectors 92b, 92c of the object image data 34b and the designated area image data 34c. The two-dimensional graph data for model 36a corresponds to the "first graph data" in the present invention, and the two-dimensional graph data for discrimination 36b is an example of an implemented configuration corresponding to the "second graph data" and the "third graph data" in the present invention.

Figure 5:
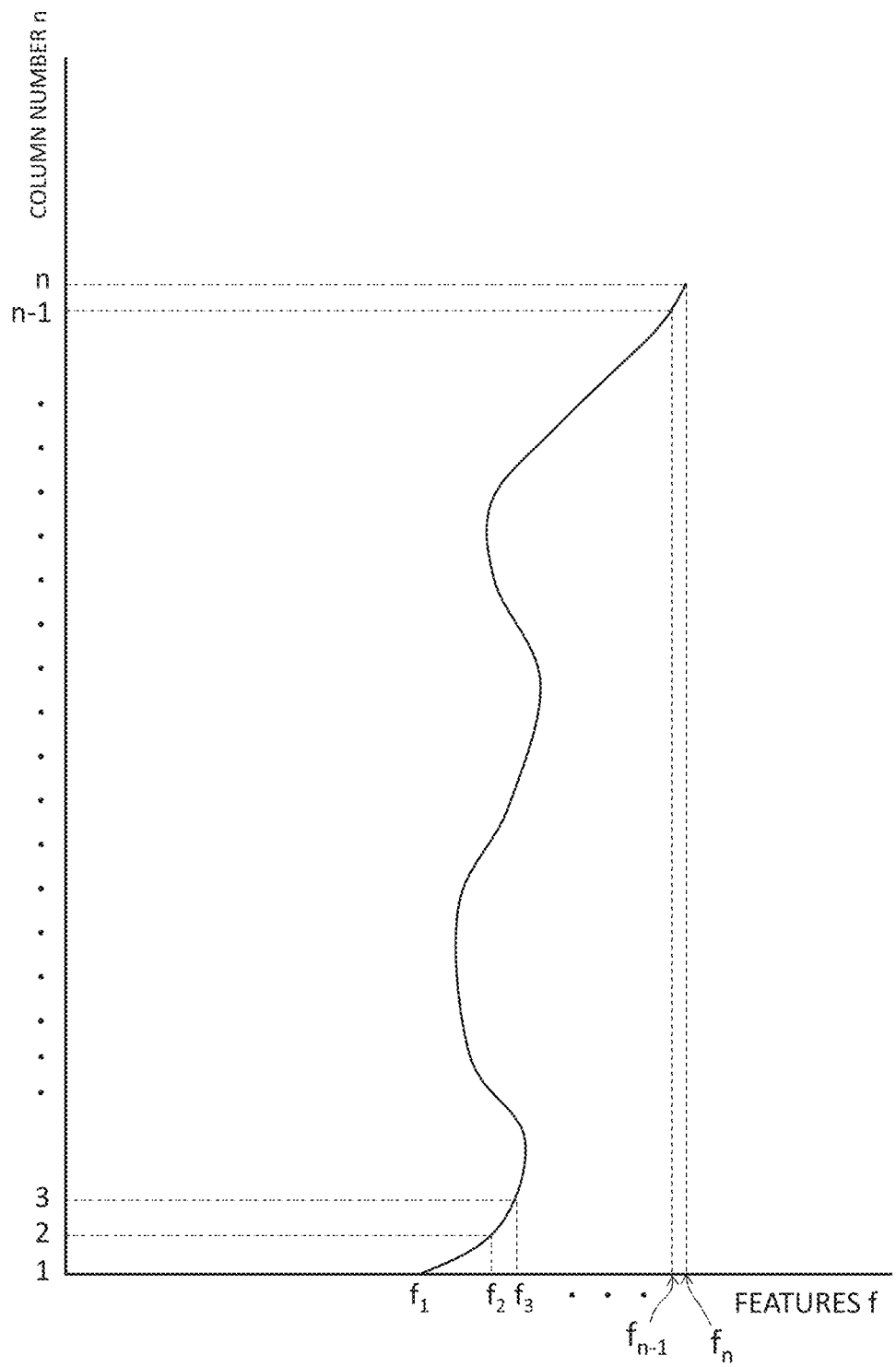
FIG. 5 is an explanatory diagram showing an outline of two-dimensional graphing of the second multi-dimensional feature vectors 92a, 92b, 92c.

Specifically, the second multi-dimensional feature vectors 92a, 92b, 92c are used as a set of the features for the number of dimensions to generate the two-dimensional graph data for model 36a and the two-dimensional graph data for discrimination 36b. For example, when the second multi-dimensional feature vectors 92a, 92b, 92c are n-dimensional column vectors (f1, f2, f3, ..., fn-1, and fn), the data as a set of n features f1, f2, f3, ..., fn-1, and fn is generated wherein the data can be displayed as a two-dimensional graph, as shown in FIG. 5, by plotting and connecting the features f1, f2, f3, ..., fn-1, and fn by a curve or a straight line on a coordinate system (rectangular coordinate system) with column numbers 1, 2, 3, ..., n-1, and n on the vertical axis and the features f1, f2, f3, ..., fn-1, and fn on the horizontal axis.

So as to examine the training results of the trained model 35 (the feature extractor 26 and the feature converter 27) and improve the training accuracy of the trained model 35, when a user selects one sample image datum 34a having an instruction signal out of the sample image data 34a having instruction signals stored in the storage unit 33, the two-dimensional graph data generation unit 30 extracts the two-dimensional graph datum for model 36a (hereinafter referred to as "selected two-dimensional graph datum 36a'") generated based on the second multi-dimensional feature vector datum 92a of the one sample image datum 34a having an instruction signal, out of the two-dimensional graph data for model 36a. The selected two-dimensional graph datum 36a' is an example of an implemented configuration corresponding to the "second graph data" in the present invention.

Color information (color tone information and gradation information, such as RGB information) is added to the two-dimensional graph data for model 36a. Here, color information of similar colors is added to the second multi-dimensional feature vectors 92a that have identical instruction signals to each other. Specifically, in the present embodiment, blue colors are given to the two-dimensional graph data for model 36a for good products, and red colors are given to the two-dimensional graph data for model 36a for defective products. The generated two-dimensional graph data for model 36a is stored in the storage unit 33. The above embodiment in which blue colors are given to the two-dimensional graph data for model 36a for good products, and red colors are given to the two-dimensional graph data for model 36a for defective products is an example of an implemented configuration corresponding to the embodiment in which "identical or similar graphs in the plurality of graphs are displayed in an identical or similar style to each other, and dissimilar graphs are displayed in different styles from each other" and the embodiment in which "first identical or similar identification information is added to the data identical or similar to each other in the plurality of first graph data" in the present invention.

To the two-dimensional graph data for discrimination 36b and the selected two-dimensional graph datum 36a', color information different from that for the two-dimensional graph data for model 36a is added. Specifically, in the present embodiment, yellow colors are given to those data 36b and 36a'. The extracted two-dimensional graph datum 36a' or the generated two-dimensional graph data for discrimination 36b is supplied to the image display control unit 20. Note that the two-dimensional graph data for discrimination 36b is stored in the storage unit 33. The two-dimensional graphing data generation unit 30 is an example of an implemented configuration corresponding to the "graph generation unit" in the present invention. The above aspect in which yellow colors are given to the two-dimensional graph data for discrimination 36b and the selected two-dimensional graph datum 36a' is an example of an implemented configuration corresponding to the aspect of "displaying a graph of the fourth multi-dimensional feature vectors in the first section in a style different from the styles of the plurality of graphs," the aspect of "displaying a graph of the sixth multi-dimensional feature vectors in the first section in a style different from the styles of the plurality of graphs," the aspect of "adds second identification information, which is different from the first identification information, to the second graph data," and the aspect of "adds third identification information, which is different from the first identification information, to the third graph data," in the present invention.

When a command button that has an instruction to display a similar two-dimensional graph Sg, among various command buttons displayed on the window 62, is pressed by an input operation via the input device 14 by a user, the selection unit 31 selects, out of the plurality of second multi-dimensional feature vectors 92a stored in the storage unit 33, a second multi-dimensional feature vector 92a' (hereinafter referred to "minimum distance second multi-dimensional feature vector") at the shortest distance from the second multi-dimensional feature vectors 92c extracted from the designated area image data 34c. Also, the selection unit 31 selects, out of the two-dimensional graph data for model 36a, the two-dimensional graph datum (similar two-dimensional graph data) 36c generated based on the selected minimum distance second multi-dimensional feature vector 92a', and supplies the selected similar two-dimensional graph datum 36c to the image display control unit 20, the storage unit 33, and the like. Here, the similar two-dimensional graph datum 36c corresponds to the "fourth graph data" in the present invention, and the graph generated based on the similar two-dimensional graph datum 36c is an example of an implemented configuration corresponding to the "a graph similar to the graph of the sixth multi-dimensional feature vectors in the plurality of graphs" in the present invention.

Here, in the present embodiment, the selection of the minimum distance second multi-dimensional feature vector 92a' is conducted based on the distance data 38 stored in the storage unit 33. Specifically, the second multi-dimensional feature vectors 92a' is selected as a combination that provides a minimum distance between the second multi-dimensional feature vectors 92c of the designated area image data 34c and the second multi-dimensional feature vectors 92a of each of the plurality of sample image data 34a having instruction signals.

Note that the selection unit 31 adds color information different from any of the above-mentioned color information to the selected similar two-dimensional graph datum 36c. Specifically, in the present embodiment, white colors are added. The embodiment in which white colors are added to the similar two-dimensional graph datum 36c is an example of an implemented configuration corresponding to the aspect in which "the similar graph to the graph of the sixth multi-dimensional feature vectors is displayed in the first section in a style different from those of the plurality of graphs and the graph of the sixth multi-dimensional feature vectors," and the embodiment in which "fourth identification information different from the first and second identification information is added to the fourth graph data" in the present invention.

When a command button that has an instruction to display a bar graph Bg, among various command buttons displayed on the window 62, is pressed by an input operation via the input device 14 by a user, the notification unit 32 selects the minimum distance among the distances between each of the second multi-dimensional feature vectors 92a of the sample image data 34a with instruction signals that have been classified as good products in the generation stage of the trained model 35 and the second multi-dimensional feature vectors 92c of the designated area image data 34c, generates bar graph data 39 based on the minimum distance, and supplies the generated bar graph data 39 to the image display control unit 20, the storage unit 33, and the like.

Here, in the present embodiment, the minimum distance is selected based on the distance data 38 stored in the storage unit 33. Specifically, the minimum value is selected among the distances between the second multi-dimensional feature vectors 92c of the designated area image data 34c and each of the second multi-dimensional feature vectors 92a of a plurality of good products.

The notification unit 32 generates the bar graph data 39 in such a configuration that the bars in a graph become longer as the minimum distance increases. Note that another configuration is possible in which the bars in a graph are displayed in different colors depending on whether the minimum distance is small or large.

In the present embodiment, the smaller the minimum distance, the stronger the blue colors, and the larger the minimum distance, the stronger the red colors. Thus, the bar graph enables the user (the person to discriminate) to know at a glance whether the designated area image represents a good product or a defective product, and also how close it is to a good product or a defective product. Here, the second multi-dimensional feature vectors 92a of a plurality of good products correspond to the "predetermined second multi-dimensional feature vectors" in the present invention. The second multi-dimensional feature vector 92a', in the second multi-dimensional feature vectors 92a of the sample image data 34a having instruction signals that have been classified as good products in the generation stage of the trained model 35, that is at the shortest distance to the second multi-dimensional feature vectors 92c of the designated area image data 34c corresponds to the "reference value" in the present invention. The minimum distance is an example of an implemented configuration corresponding to the "difference" and "one-dimensional numeral value" in the present invention. In addition, the aspect in which a bar graph based on the size of the minimum distance is displayed on the window 62 is an example of an implemented configuration corresponding to the "the calculated difference is notified in a visual and/or auditory and/or tactile mode" in the present invention.

The storage unit 33 stores: the sample image data 34a having instruction signals and the object image data 34b that are secured in at least one of the RAM 6 and the HDD 10 and that are captured by the camera 70 (see FIG. 1); the designated area image data 34c obtained by the area designation unit 24; the trained model 35; the two-dimensional graph data for model 36a and the two-dimensional graph data for discrimination 36b that are generated by the two-dimensional graph data generation unit 30; the similar two-dimensional graph datum 36c generated by the selection unit 31; the second multi-dimensional feature vectors 92a, 92b, and 92c converted by the feature converter 27; the distance data 38 calculated by the distance calculator 29; and the bar graph data 39 generated by the notification unit 32.

The visualization program includes a routine to visualize a trained-model generation stage that is executed in the generation stage of trained model 35, and a routine to visualize a discrimination stage that is executed in the accuracy improvement stage of the trained model 35 and in the discrimination stage of the class of an object. In order to visualize the trained state (individuality) of the trained model 35 and the discrimination result of an object, the visualization program has a function to cause the image display control unit 20 to display: the two-dimensional model graphs Og and Ng (see FIGS. 15 and 16) and the two-dimensional graph for discrimination Dg (see FIG. 16); and the selected two-dimensional graph Cg (see FIG. 16), the similar two-dimensional graph Sg (see FIGS. 15 and 16), and the bar graph Bg (see FIGS. 15 and 16) on the window 62, based on the two-dimensional graph data for model 36a, the two-dimensional graph data for discrimination 36b, and the selected two-dimensional graph datum 36a' that are generated by the two-dimensional graph data generation unit 30; the similar two-dimensional graph datum 36c generated by the selection unit 31; and the bar graph data 39 generated by the notification unit 32.

Figure 6:
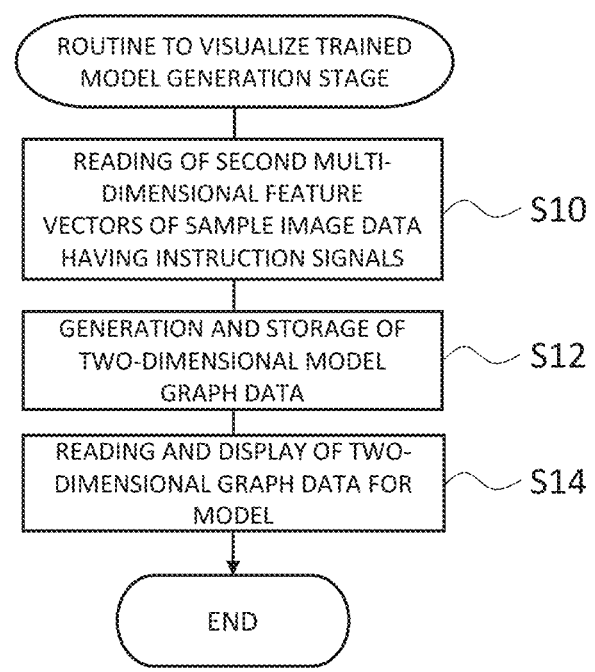
FIG. 6 is a flowchart showing an example of a routine to visualize a trained-model generation stage.
Figure 7:
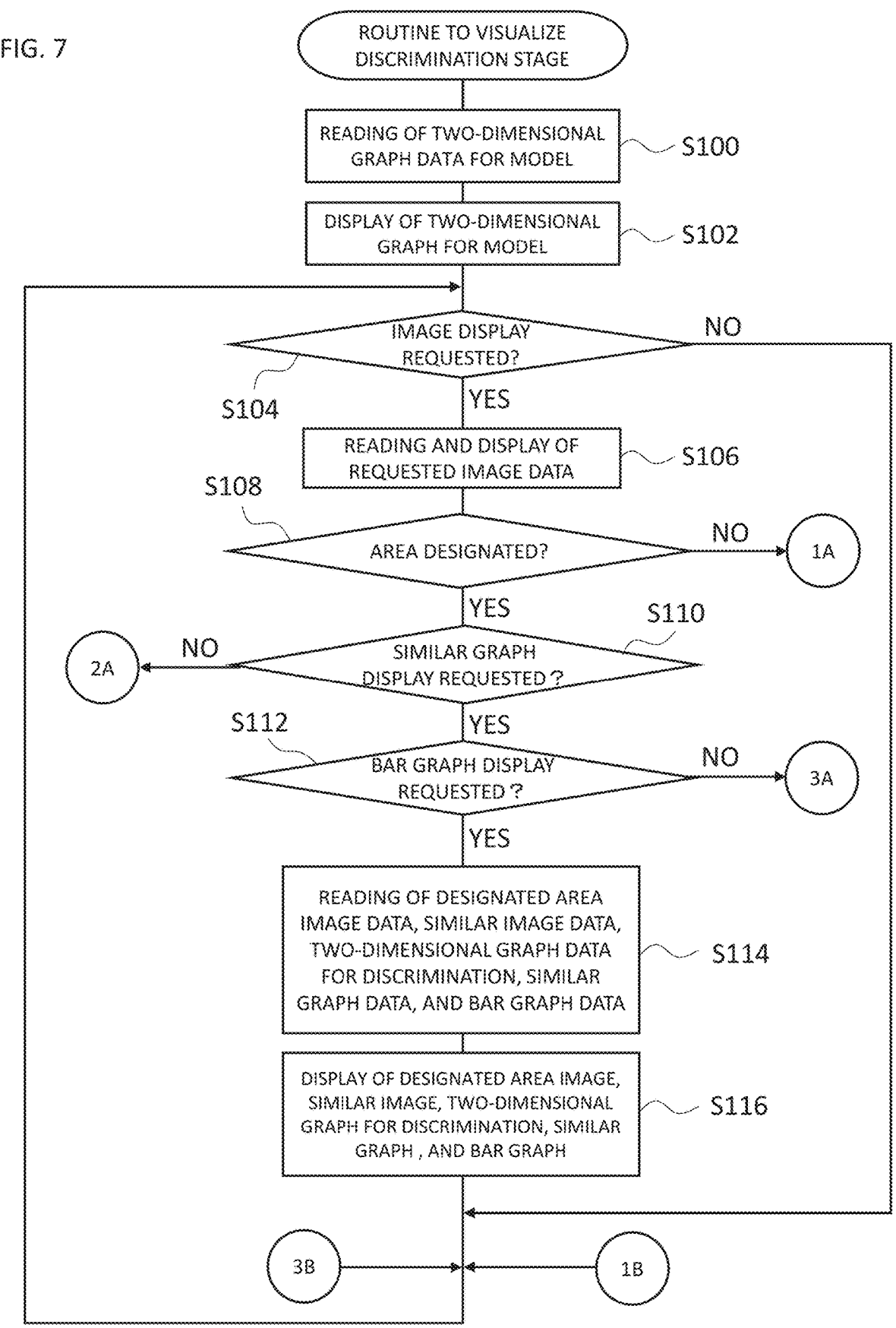
FIG. 7 is a flowchart showing an example of a routine to visualize a discrimination stage.
Figure 8:
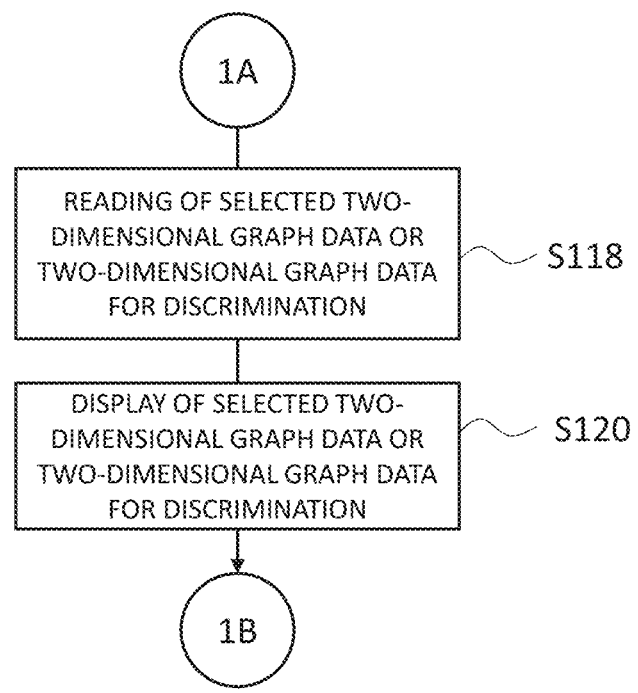
FIG. 8 is a flowchart of a portion branched from the routine to visualize a discrimination stage.
Figure 9:
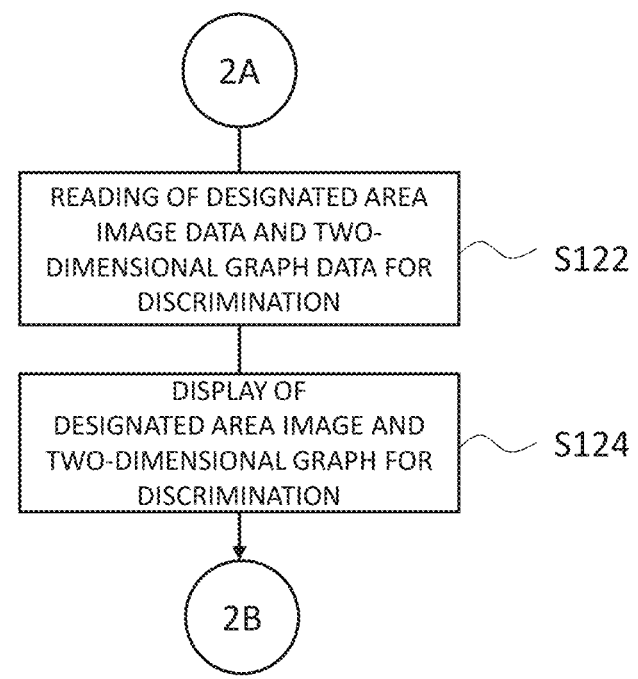
FIG. 9 is a flowchart of a portion branched from the routine to visualize a discrimination stage.
Figure 10:
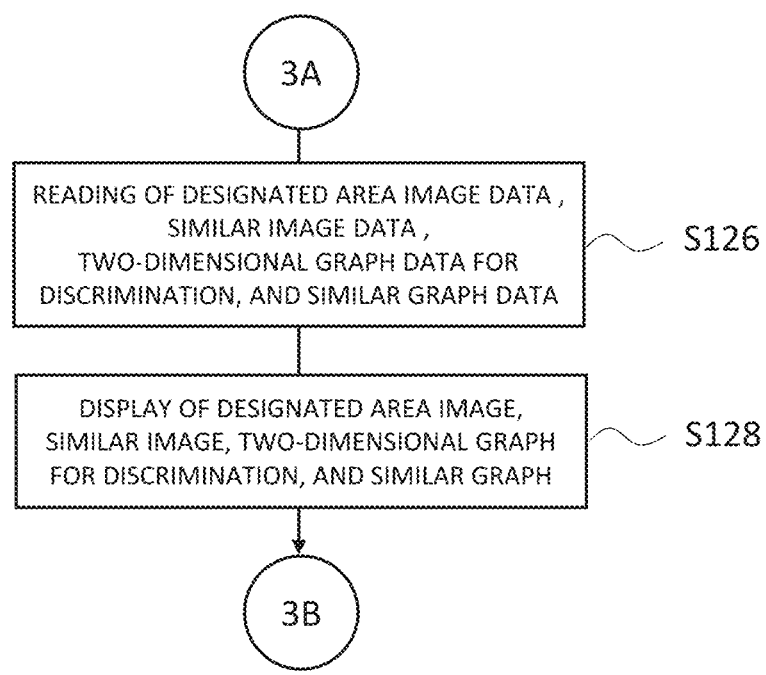
FIG. 10 is a flowchart of a portion branched from the routine to visualize a discrimination stage.

Next, the visualization program executed on the computer 1 when the discrimination application is started will be described. First, a routine to visualize a trained-model generation stage will be described, and then a routine to visualize a discrimination stage will be described. FIG. 6 is a flowchart showing an example of the routine to visualize a trained-model generation stage, FIG. 7 is a main flowchart showing an example of the routine to visualize a discrimination stage, and FIGS. 8, 9, and 10 are each a sub-flow chart branched from the main flowchart of FIG. 7.

The routine to visualize a trained-model generation stage is executed, for example, when a user presses the "trained-model generation" button out of various command buttons displayed on the window 62. The routine to visualize a trained-model generation stage is mainly executed by the image display control unit 20, the image acquisition unit 22, the feature extractor 26, the feature converter 27, the distance calculator 29, the two-dimensional graph data generation unit 30, and the like.

Figure 12:
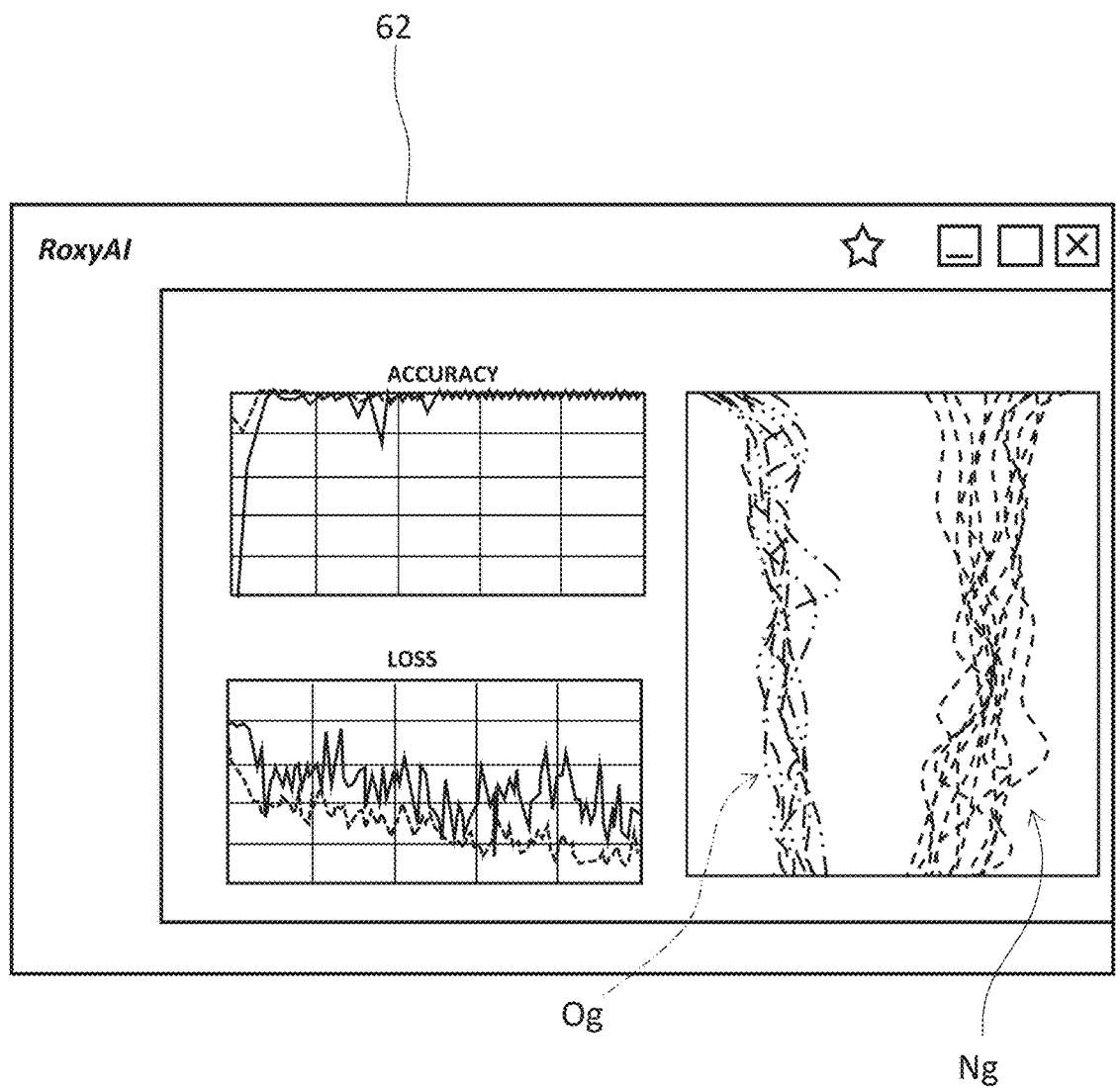
FIG. 12 is an explanatory diagram showing a window 62 in which the two-dimensional model graphs Og and Ng are displayed.

In the routine to visualize a trained-model generation stage, processing for visualizing the trained model 35 is executed. Specifically, as shown in FIG. 6, first, the two-dimensional graph data generation unit 30 executes processing for reading in the second multi-dimensional feature vectors 92a of the sample image data 34a having instruction signals stored in the storage unit 33 (Step S10), generating the two-dimensional graph data for model 36a based on the read-in second multi-dimensional feature vectors 92a, and storing the data 36a in the storage unit 33 (Step S12). Also, the image display control unit 20 executes processing for reading in the two-dimensional graph data for model 36a stored in the storage unit 33, displaying the two-dimensional model graphs Og and Ng (see FIG. 12) on the window 62 based on the read-in two-dimensional graph data for model 36a (Step S14), and terminating the routine. Here, in the generation stage of the trained model 35, the two-dimensional model graphs Og and Ng can be displayed on the window 62 together with a graph of a trained state (one-dimensional numerical indicators) obtained by the prior art for displaying the discrimination accuracy calculated by the feature extractor 26, the feature converter 27, and the classifier 28, and the loss calculated by the feature extractor 26, the feature converter 27, and the distance calculator 29, as shown in FIG. 12, for example. In this case, the display section of the window 62 for the two-dimensional model graphs Og and Ng is an example of an implemented configuration corresponding to the "first section" in the present invention. Also, the two-dimensional model graph Og for good product and the two-dimensional model graph Ng for defective product are an example of an implemented configuration corresponding to the "a plurality of graphs" in the present invention.

As described above, the two-dimensional model graphs Og and Ng based on the second multi-dimensional feature vectors 92a appropriate for visualization of the trained state of the trained model 35 are displayed on the window 62, and thereby whether trained model 35 is in an appropriate trained state (individuality) or not can be visually checked and evaluated. In general, the trained state (individuality) of the trained model 35 is evaluated by one-dimensional numerical indicators such as a correct answer rate, a match rate, and a reproduction rate, but even if these numerical indicators are the same, different discrimination accuracy and reliability are calculated for different trained models 35. Thus, the inventors of the present invention conducted intensive research and found that an appropriately trained model 35 can be generated by visually checking the trained state (individuality).

Figure 11A:
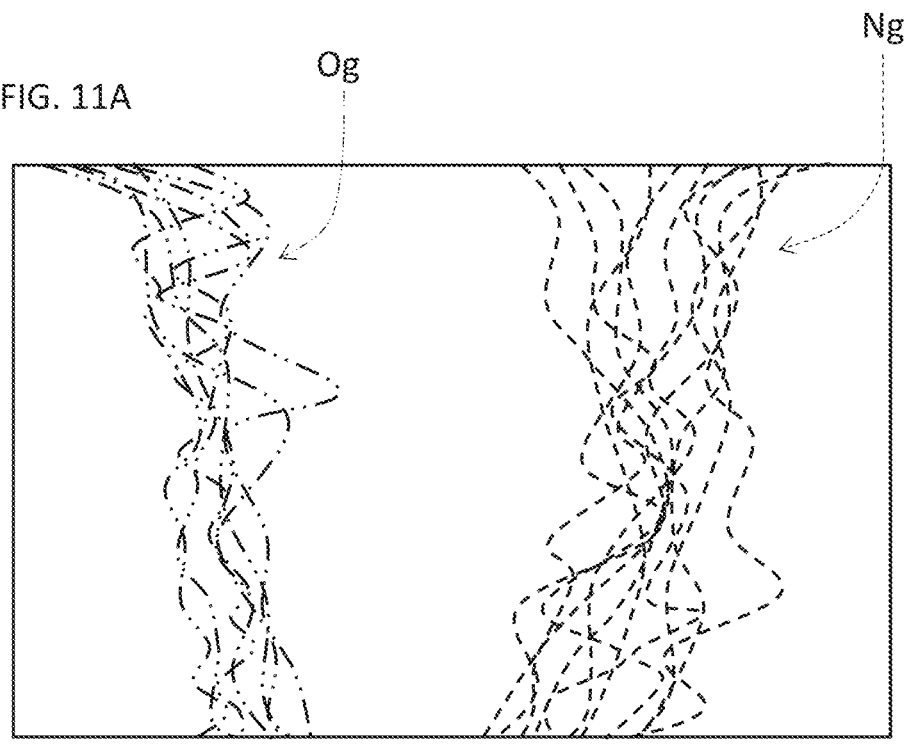
FIG. 11 is an explanatory diagram showing the trained states (individuality) of the trained models 35 having identical numerical indicators therebetween.
Figure 11B:
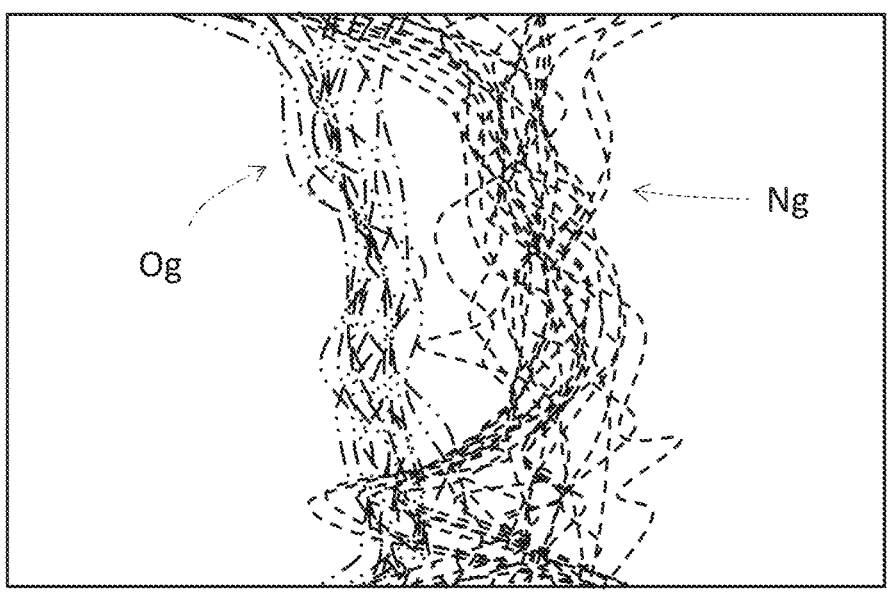

FIG. 11 is an explanatory diagram showing the trained states (individuality) of trained models 35 having the same numerical indicators. Note that FIG. 11A shows two-dimensional model graphs Og and Ng of the trained model 35 that are in an appropriate trained state (individuality), and FIG. 11B shows two-dimensional model graphs Og and Ng of the trained model 35 that are in an inappropriate trained state (individuality). Here, in the present embodiment, the two-dimensional graph data for model 36a of good products are colored in blue, and the two-dimensional graph data for model 36a of defective products are colored in red. Accordingly, in practice, the two-dimensional model graphs Og for good product are displayed in blue colors, and the two-dimensional model graphs Ng for defective product are displayed in red colors. However, for convenience in FIG. 11, the blue colors are described as two-point chain lines, and the red colors are described as broken lines.

As shown in FIG. 11A, when the trained model 35 is in an appropriate trained state (individuality), the two-dimensional model graph Og generated based on the sample image data 34a having instruction signals of good products and the two-dimensional model graph Ng generated based on the sample image data 34a having instruction signals of defective products are clearly separately displayed, and the boundary therebetween is clear. On the other hand, if the trained state (individuality) of the trained model 35 is not appropriate, the two-dimensional model graph Og and the two-dimensional model graph Ng are displayed in close proximity, and the boundary therebetween is unclear.

As described above, visualization of the trained state (individuality) of the trained model 35 enables evaluation of whether the trained model 35 is in a trained state (individuality) to appropriately discriminate the class of an object. Accordingly, an appropriately trained model 35 can be generated with a smaller number of sample data than before. As a result, an appropriately trained model 35 can be generated easily and rapidly. Needless to say, the trained state (individuality) of the trained model 35 can be visually checked, which enhances the reliability of the trained model 35. Further, since an appropriately trained model 35 can be generated, the threshold value appropriate for classification of an object by the classifier 28 can be widely set. As a result, erroneous discriminations can be decreased which are caused by disturbances including the adverse effects of external light used to obtain an image of an object, leading to the stable acquisition of accurate discrimination results.

Next, a routine to visualize a discrimination stage will be described. The routine to visualize a discrimination stage is executed, for example, when a user presses the "test of trained model" button, the "better accuracy of trained model" button, or the "discrimination of object" button among various command buttons displayed on the window 62. The routine to visualize a discrimination stage is mainly executed by the image display control unit 20, the image acquisition unit 22, the area designation unit 24, the feature extractor 26, the feature converter 27, the classifier 28, the two-dimensional graph data generation unit 30, the selection unit 31, and the notification unit 32 of the computer 1.

In the routine to visualize a discrimination stage, as shown in FIG. 7, first, processing for reading in the trained model 35 is executed. Specifically, the image display control unit 20 executes processing for reading in the two-dimensional graph data for model 36a stored in the storage unit 33 (Step S100) and displaying two-dimensional model graphs Og and Ng (see FIG. 11) in the first section 62a of the window 62 (see FIG. 1) based on the read-in two-dimensional graph data for model 36a (Step S102). Here, the two-dimensional graph data for model 36a have been generated by the two-dimensional graph data generation unit 30 and stored in the storage unit 33 in Step S12 of the above-described routine to visualize a trained-model generation stage. In this case, the first section 62a is an example of an implemented configuration corresponding to the "first section" in the present invention.

In Step S102, after executing the processing for displaying the two-dimensional model graphs Og and Ng in the first section 62a of the window 62 (see FIG. 1), the image display control unit 20 subsequently executes processing for determining the presence/absence of an image display request (Step S104). Here, the "image display request" is determined to be "present," for example, when the user selects one sample image datum 34a having an instruction signal out of the plurality of sample image data 34a having instruction signals stored in the storage unit 33 or when the image acquisition unit 22 acquires an image of an object to be discriminated.

When no image display request is present, the processing of Step S104 is repeatedly executed until the image display request appears. When the image display request is present, the image display control unit 20 executes processing for reading in the image data of the request (a sample image datum 34a having an instruction signal or an object image datum 34b), and displaying the image of the request (a sample image datum having an instruction signal or an object image) based on the read-in image data (a sample image datum 34*a* having an instruction signal or an object image datum 34*b*) in the second section 62*b* of the window 62 (see FIG. 1) (Step S106).

Next, the image display control unit 20 executes processing for determining whether or not an area of the image (the sample image datum having an instruction signal or the object image) displayed in the second section 62*b* of the window 62 (see FIG. 1) has been designated by a user (Step S108). Whether or not an area of the image has been designated by a user can be determined, for example, by whether or not the designated area image data 34*c* has been input from the area designation unit 24.

When an area of the image has been designated by a user, processing for determining whether or not a display request for a similar two-dimensional graph Sg (see FIG. 13) is present (Step S110). Here, the presence/absence of a display request for the similar two-dimensional graph Sg (see FIG. 13) can be determined, for example, by whether or not the similar two-dimensional graphing datum 36*c* has been input from the selection unit 31.

When the display request for the similar two-dimensional graph Sg (see FIG. 13) is present, processing for determining whether or not a display request for a bar graph Bg (see FIG. 13) is present (Step S112). Here, the presence/absence of a display request for a bar graph Bg (see FIG. 13) can be determined, for example, by whether or not a bar graph data 39 has been input from the notification unit 32.

When the display request for a bar graph Bg (see FIG. 13) is present, the image display control unit 20 executes processing for reading in the designated area image data 34*c*, the sample image data 34*a* having instruction signals and including the minimum distance second multi-dimensional feature vector 92*a*' (the second multi-dimensional feature vector 92*a* closest to the second multi-dimensional feature vectors 92*c* extracted from the designated area image data 34*c*) (hereinafter, referred to "similar image data 34*a*'"), the two-dimensional graph data for discrimination 36*b* generated based on the second multi-dimensional feature vectors 92*c* of the designated area image data 34*c*, the similar two-dimensional graph datum 36*c*, and the bar graph data 39 (Step S114).

Here, the two-dimensional graphing data for discrimination 36*b* is generated, when an area is designated, by the two-dimensional graph data generation unit 30 based on the second multi-dimensional feature vectors 92*c* of the designated area image data 34*c*, and is output to the image display control unit 20. The similar two-dimensional graphing datum 36*c* is generated by the selection unit 31 based on the minimum distance second multi-dimensional feature vector 92*a*' when the display request for the similar two-dimensional graph Sg is present (that is when the command button that has an instruction to display a similar two-dimensional graph Sg is pressed), and is output to the image display control unit 20. The bar graph data 39 is generated, when a display request for bar graph Bg is present, by the notification unit 32 based on the minimum distance among the distances between the second multi-dimensional feature vectors 92*c* of the designated area image data 34*c* and each of the second multi-dimensional feature vectors 92*a* of the plurality of the sample image data 34*a* having instruction signals that are classified as good products. The bar graph data 39 is then output to the image display control unit 20.

Figure 13:
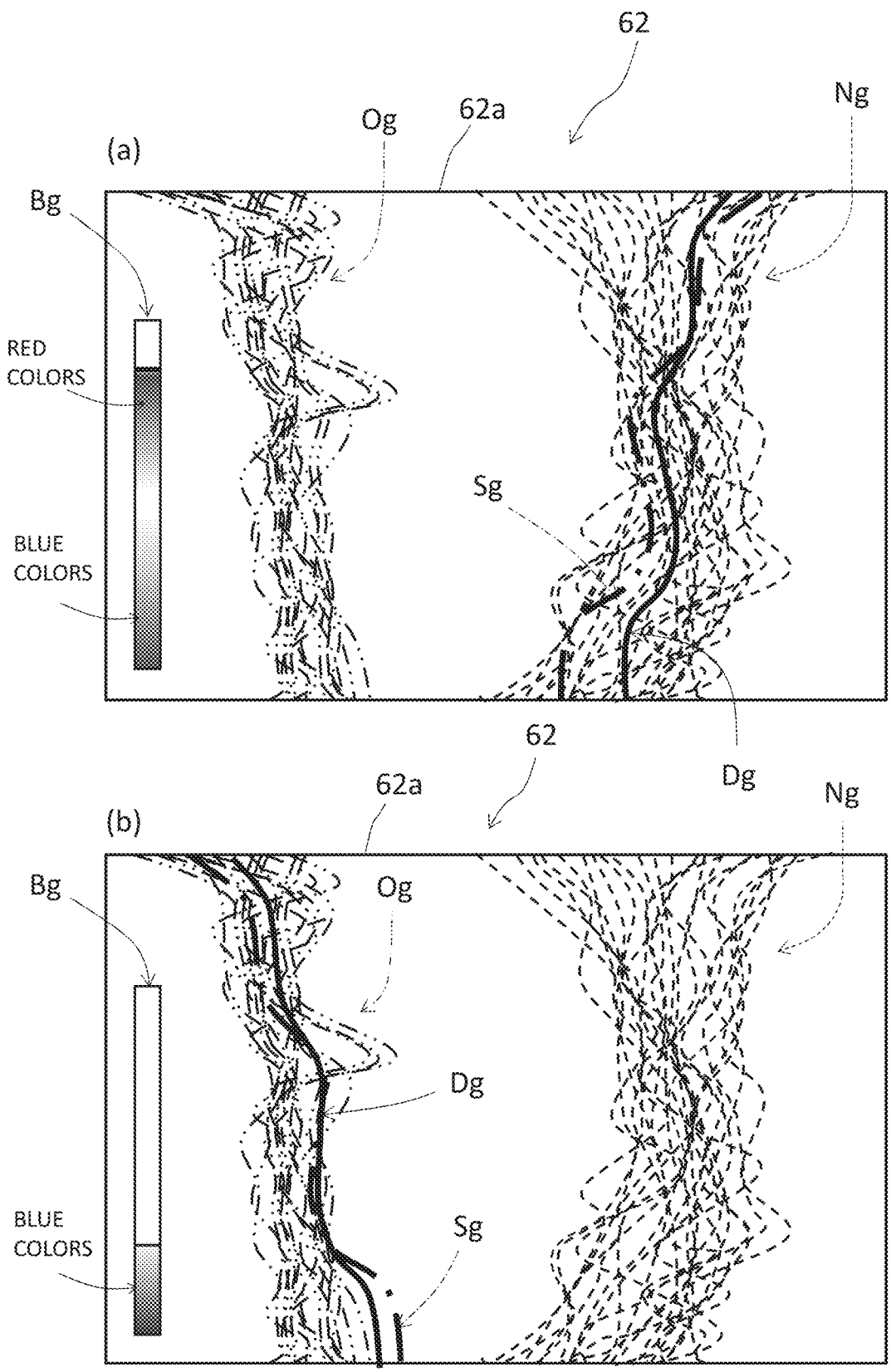
FIG. 13 is an explanatory diagram showing a state in which the two-dimensional model graphs Og and Ng, a two-dimensional graph for discrimination Dg, a similar two-dimensional graph Sg, and a bar graph Bg are displayed in a first section 62a of the window 62.

Subsequently, processing is performed for: displaying the designated area image in the third section 62*c* of the window 62 (see FIG. 1) based on the read-in designated area image data 34*c*, similar image data 34*a*', two-dimensional graph data for discrimination 36*b*, similar two-dimensional graph datum 36*c*, and bar graph data 39; displaying a similar image in the fourth section 62*d* of the window 62 (see FIG. 1); and, as shown in FIG. 13, displaying a two-dimensional graph for discrimination Dg, a similar two-dimensional graph Sg, and a bar graph Bg together with the two-dimensional model graphs Og and Ng that have been already displayed in the first section 62*a* of the window 62 (Step S116), and the processing returns to Step S104. Here, the two-dimensional graph for discrimination Dg is an example of an implemented configuration corresponding to the "graph of the fourth multi-dimensional feature vectors" and the "graph of the sixth multi-dimensional feature vectors" in the present invention.

FIG. 13 is an explanatory diagram showing a state in which, in addition to the two-dimensional model graphs Og and Ng, a two-dimensional graph for discrimination Dg, a similar two-dimensional graph Sg, and a bar graph Bg are displayed in the first section 62*a* of the window 62. Note that FIG. 13A is an explanatory diagram showing a state in which a two-dimensional graph for discrimination Dg and a similar two-dimensional graph Sg are displayed on the side of the two-dimensional model graph Ng for good product, and FIG. 13B is an explanatory diagram showing a state in which a two-dimensional graph for discrimination Dg and a similar two-dimensional graph Sg are displayed on the side of the two-dimensional model graph Og for defective product. Here, in the present embodiment, the two-dimensional graph for discrimination Dg is colored in yellow, and the similar two-dimensional graph Sg is colored in white. Thus, in practice, the two-dimensional graph for discrimination Dg is displayed in yellow colors, and the similar two-dimensional graph Sg is displayed in white colors. However, for convenience in FIG. 13, the yellow colors are described as thick solid lines and the white colors are displayed as thick one-dot chain lines.

As described above, in addition to the two-dimensional model graphs Og and Ng, the state of the second multi-dimensional feature vectors 92*c* in the area designated by a user is displayed as a two-dimensional graph for discrimination Dg, and thereby the discrimination result of the class of the designated area can be visualized. As a result, the user can visually check the discrimination result of the portion in concern (for example, if there is a scratch on an object, whether the scratch is being discriminated as defective can be checked), and, depending on the discrimination result of the portion in concern (that is, when a good product is discriminated as defective, or conversely when a defective product is discriminated as good), the feature extractor 26 and the feature converter 27 may be trained again, or the classifier 28 may be trained again.

When an above-mentioned erroneous discrimination occurs (when a good product is discriminated as defective, or conversely when a defective product is discriminated as good), the shapes of the two-dimensional model graphs Og and Ng and the two-dimensional graph for discrimination Dg and the behavior of the two-dimensional graph for discrimination Dg are checked, so that it can be determined whether the cause of the erroneous discrimination lies in the trained state of the feature extractor 26 and the feature converter 27 or in the machine learning of the arithmetic parameters of the classifier 28 and/or the setting of the threshold value. Note that the behavior of the two-dimensional graph for discrimination Dg means the changes in the two-dimensional graph for discrimination Dg when various areas are designated by a user on the image (a sample image having an instruction signal or an object image that is selected by the user) displayed in the second section 62b of the window 62 (see FIG. 1).

Figure 14:
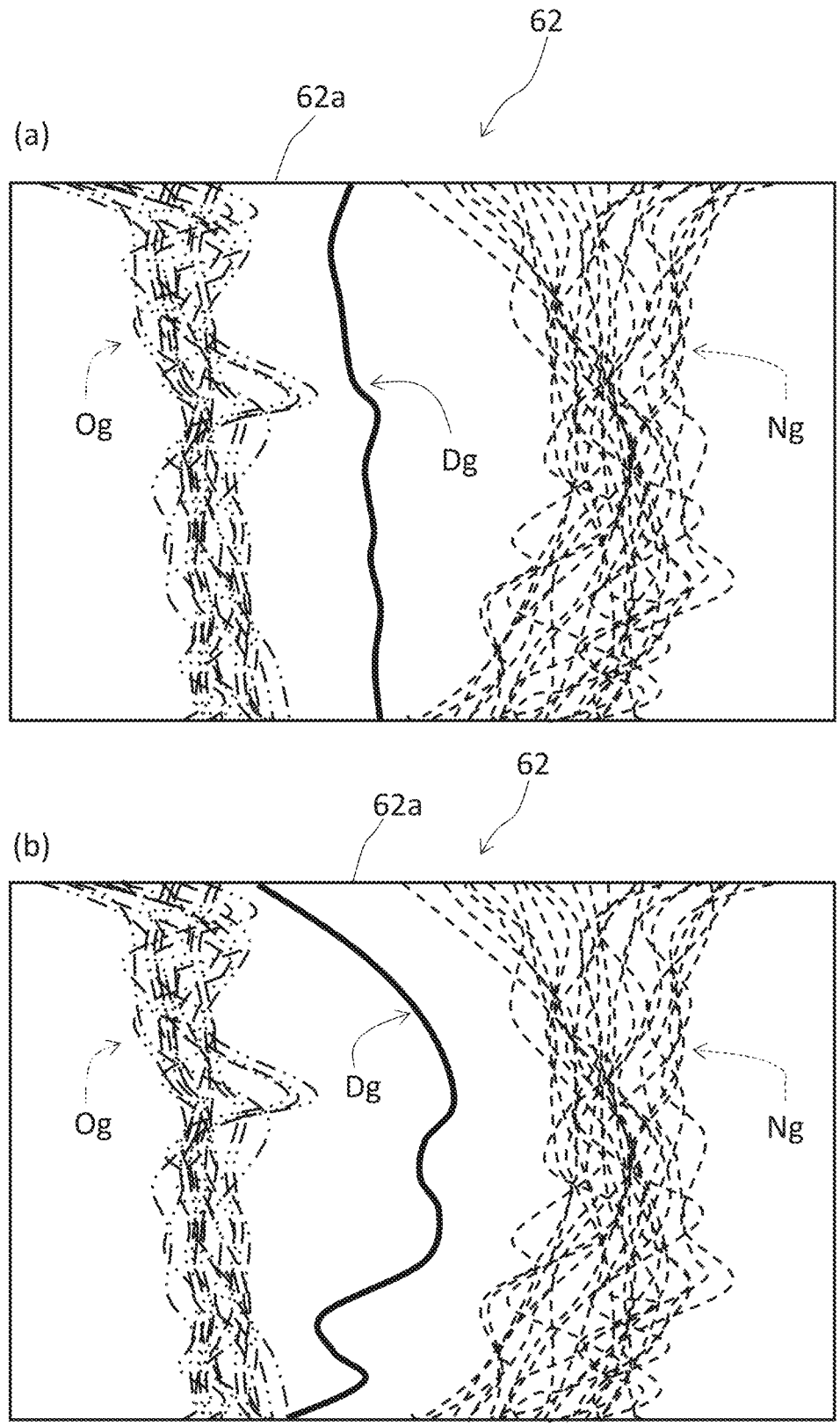
FIG. 14 is an explanatory diagram showing a two-dimensional graph for discrimination Dg in a case where the setting of the calculation parameter or the threshold value of a classifier 28 is not appropriate.

In a case, as shown in FIG. 14A, where the two-dimensional graph for discrimination Dg is deviated from the two-dimensional model graph Ng and is different in shape from the two-dimensional model graph Ng, but the product is determined as defective, or in a case, as shown in FIG. 14B, where the two-dimensional graph for discrimination Dg is deviated from the two-dimensional model graph Og and different in shape from the two-dimensional model graph Og, but the product is determined as good, that is, when the features of the good product and defective product are well captured, but the classifications of the products are wrong, the machine learning of the arithmetic parameters of the classifier 28 and/or the setting of the threshold value can be determined inappropriate. In this case, the machine learning of the arithmetic parameters of the classifier 28 and/or the setting of the threshold value are reset for improvement in discrimination.

In contrast, in a case where the user changes the area to be designated from a normal portion to a portion having defects such as scratch on the image (a sample image having an instruction signal or an object image that is selected by the user) displayed in the second section 62b of the window 62 (see FIG. 1), but no or little change is observed in the behavior of the two-dimensional graph for discrimination Dg, that is, when the features of the good product and defective product are not well captured, the learning of the feature extractor 26 and the feature converter 27 can be determined inappropriate. In this case, the feature extractor 26 and the feature converter 27 are retrained for improvement in discrimination.

As described above, according to the discrimination device of the present embodiment, the feature extractor 26, the feature converter 27, and the classifier 28 are provided as separate configurations, and the trained state (individuality) of trained model 35 can be visualized. Accordingly, when an erroneous discrimination occurs, the cause of the erroneous discrimination can be easily identified, and the error can be appropriately dealt. As a result, the discrimination accuracy of the discrimination device can be enhanced easily and rapidly, and the reliability of the trained model 35 can be improved. In addition, while an area of an image (a sample image having instruction signals or an object image that is selected by user) displayed in the second area 62b of the window 62 (see FIG. 1) is being designated, the discrimination result of the class of the area can be checked by using the first section 62a of the window 62, and thereby the operation is easy.

Not only the two-dimensional model graphs Og and Ng and the two-dimensional graph for discrimination Dg, also the similar two-dimensional graph Sg are displayed, and thereby it can be checked whether the features of an area are appropriately captured. As shown in FIG. 13, when an area is appropriately classified (FIG. 13A shows a case where an area exhibits a defective product, and FIG. 13B shows a case where an area exhibits a good product), the two-dimensional graph for discrimination Dg and the similar two-dimensional graph Sg are checked that they show similar shapes to each other, so that it can be confirmed that the features of the area are appropriately captured.

Figure 15:
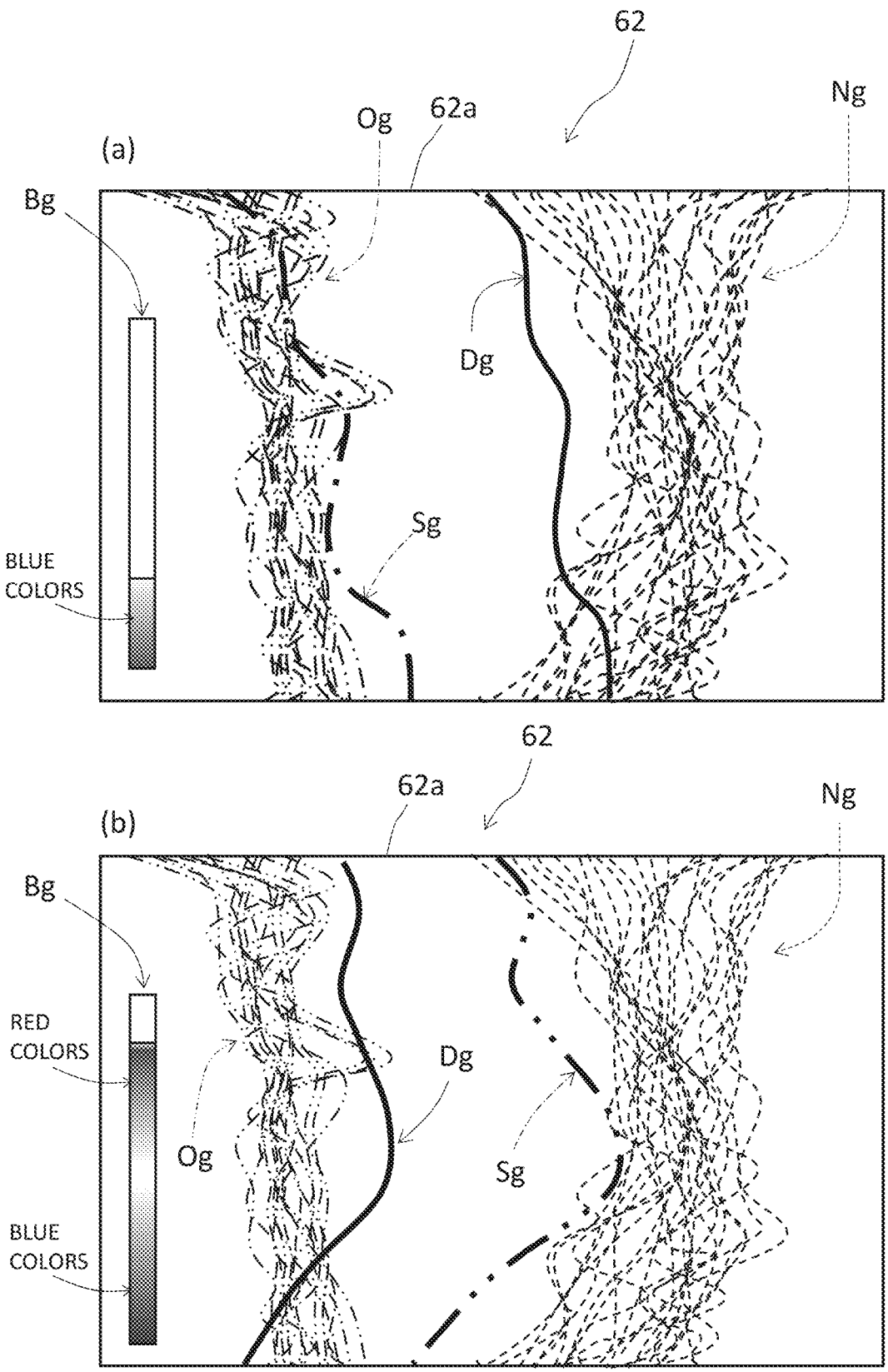
FIG. 15 is an explanatory diagram showing a state in which an error occurs in the discrimination of the class of the area designated by a user.

In contrast, as shown in FIG. 15, when an erroneous discrimination occurs in the classification of an area (FIG. 15A shows a case where an area exhibiting a defective product is classified as good, and FIG. 15B shows a case where an area exhibiting a good product is classified as defective), the sample image data 34a having instruction signals that caused the erroneous discrimination can be checked by the similar two-dimensional graph Sg. Accordingly, the feature extractor 26 and the feature converter 27 are retrained so that the distances are optimized between the second multi-dimensional feature vectors 92c in an area and the minimum distance second multi-dimensional feature vectors 92a' (the second multi-dimensional feature vectors 92a of the sample image data 34a having instruction signals) that may cause the erroneous discrimination. Alternatively, in order to reliably classify the two-dimensional graph for discrimination Dg from the similar two-dimensional graph Sg, the classifier 28 is retrained with machine learning for arithmetic parameters and the threshold value is reset. As a result, the accuracy of discrimination can be enhanced.

Furthermore, in addition to the two-dimensional model graphs Og and Ng, the two-dimensional graph for discrimination Dg, and the similar two-dimensional graph Sg, the bar graph Bg are displayed. Thus, the user can recognize how close the designated area image is to a good product or a defective product, as well as whether the image exhibits a good product or a defective product.

Figure 16:
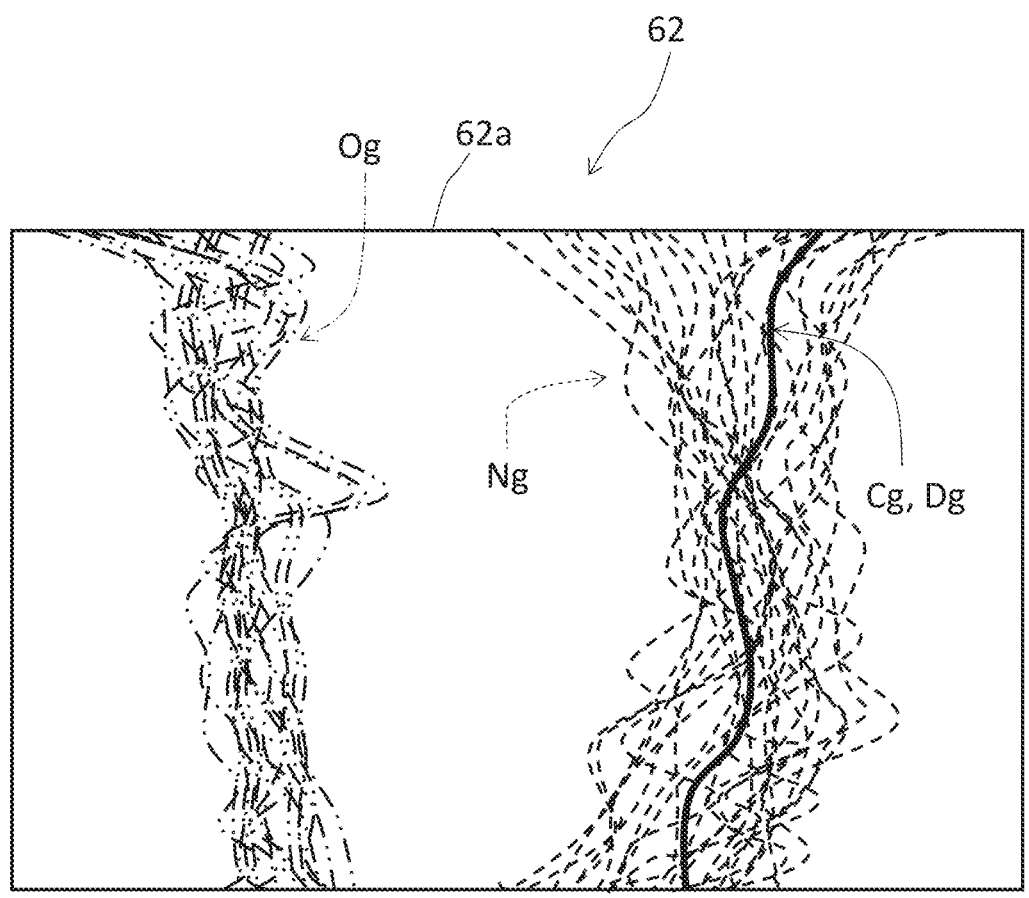
FIG. 16 is an explanatory diagram showing a state in which a selected two-dimensional graph Cg or a two-dimensional graph for discrimination Dg is displayed in the window 62.

Returning to the routine to visualize a discrimination stage, in Step S108, when no area is designated by the user, as shown in the flowchart of FIG. 8, the selected two-dimensional graph data 36a' or the two-dimensional graph data for discrimination 36b is read in (Step S118), and as shown in FIG. 16, the selected two-dimensional graph Cg or the two-dimensional graph for discrimination Dg is displayed, based on the read-in selected two-dimensional graph data 36a' or two-dimensional graph data for discrimination 36b, in the first section 62a of the window 62 together with the two-dimensional model graphs Og and Ng that have been already displayed in the first section 62a (Step S120). Then, the processing goes back to Step S104. The selected two-dimensional graph Cg is an example of an implemented configuration corresponding to the "graph of the fourth multi-dimensional feature vectors" in the present invention.

Here, the selected two-dimensional graph data 36a' is the data extracted out of the two-dimensional graph data for model 36a by the two-dimensional graph data generation unit 30 and output to the image display control unit 20, when a user selects a sample image datum 34a having an instruction signal from the sample image data 34a having instruction signals that are stored in the storage unit 33. The two-dimensional graph data for discrimination 36b is the data generated by two-dimensional graph data generation unit 30 based on the second multi-dimensional feature vectors 92b of the two-dimensional graph data for discrimination 36b and output to the image display control unit 20, when the image acquisition unit 22 acquires the object image data 34b.

When no display request for similar two-dimensional graph is present in Step S110, as shown in the flowchart of FIG. 9, processing for reading in the designated area image data 34c output from the area designation unit 24 and the two-dimensional graphing data for discrimination 36b is executed (Step S122). Here, the two-dimensional graphing data for discrimination 36b is the data generated by the two-dimensional graph data generation unit 30 based on the second multi-dimensional feature vectors 92c of the designated area image data 34c and output to the image display control unit 20, when an area is designated.

Based on the read-in designated area image data 34c and two-dimensional graphing data for discrimination 36b, the designated area image is displayed in the third section 62c of the window 62 (see FIG. 1), and as shown in FIG. 16, the two-dimensional graph for discrimination Dg is displayed in the first section 62a of the window 62 (see FIG. 1) together with the two-dimensional model graphs Og and Ng that have been already displayed in the first section 62a (Step S124). Then, the processing goes back to Step S104.

When no display request for bar graph is present in Step S112, as shown in the flowchart of FIG. 10, the image display control unit 20 executes processing for: reading in the designated area image data 34c, the similar image data 34a', the two-dimensional graph data for discrimination 36b generated base on the second multi-dimensional feature vectors 92c of the designated area image data 34c, and the similar two-dimensional graph datum 36c (Step S126). The image display control unit 20 then displays a designated area image in the third section 62c of the window 62 (see FIG. 1), based on the read-in the designated area image data 34c, similar image data 34a', two-dimensional graph data for discrimination 36b and similar two-dimensional graph datum 36c, and also displays a similar image in the fourth section 62d of the window 62 (see FIG. 1), and displays the two-dimensional graph for discrimination Dg and the similar two-dimensional graph Sg in the first section 62a of the window 62 (see FIG. 1) together with the two-dimensional model graphs Og and Ng that have been already displayed in the first section 62a (Step S128). Then, the processing goes back to Step S104.

According to the above-described discrimination device of the present embodiment, the two-dimensional model graphs Og and Ng (see FIGS. 12 and 13) are graphed based on the second multi-dimensional feature vectors 92a appropriate for visualization of the trained state (individuality) of the trained model 35 and are displayed on the window 62. Thus, whether or not the trained model 35 is in an appropriate trained state (individuality) can be visually checked and evaluated, enabling the generation of an appropriately trained model 35 with a smaller number of sample data than before. As a result, an appropriately trained model can be generated easily and rapidly. Needless to say, the trained state of the trained model 35 can be visually checked, enhancing the reliability of the trained model 35. Further, since an appropriately trained model can be generated, the threshold value used for the appropriate classification of an object can be widely set. As a result, erroneous discriminations can be decreased which are caused by disturbances including the adverse effects of external light used to obtain an image of an object, leading to the stable acquisition of accurate discrimination results. Note that, the second multi-dimensional feature vectors 92a, 92b, 92c are plotted into a two-dimensional graph, facilitating the visualization of the trained state (individuality) of the trained model 35.

According to the discrimination device of the present embodiment, the two-dimensional model graph Og for good product and the two-dimensional model graph Ng for defective product are displayed in different styles: that is, the two-dimensional model graph Og for good product is displayed in blue colors, and the two-dimensional model graph Ng for defective product are displayed in red colors, and thereby the trained state (individuality) of the trained model 35 can be visually clearer.

According to the discrimination device of the present embodiment, the selected two-dimensional graph Cg and the two-dimensional graph for discrimination Dg, which are based on the second multi-dimensional feature vectors 92a, 92b, 92c of one sample image datum 34a having an instruction signal, the object image data 34b, and the designated area image data 34c are displayed. Thus, the trained state (individuality) of the trained model 35 can be visualized, and also the discrimination of the classes of one sample image having instruction signals, an object, and a designated area image can be visualized. Note that the selected two-dimensional graph Cg and the two-dimensional graph for discrimination Dg are displayed in different styles from those of the two-dimensional model graphs Og and Ng: that is, the selected two-dimensional graph Cg and the two-dimensional graph for discrimination Dg are displayed in yellow colors, facilitating the check of the discrimination of the classes of one sample image having an instruction signal, an object, and a designated area image.

According to the discrimination device of the present embodiment, the similar two-dimensional graph Sg is displayed, and thereby whether or not the features of an area can be appropriately captured can be checked. In addition, when an erroneous discrimination occurs in the classification of an area, the sample image data 34a having instruction signals that caused the erroneous discrimination can be checked. Accordingly, the feature extractor 26 and the feature converter 27 are retrained so that the distances are optimized between the second multi-dimensional feature vectors 92c in an area and the minimum distance second multi-dimensional feature vector 92a' (the second multi-dimensional feature vector 92a of the sample image data 34a having instruction signals which is likely to cause an erroneous discrimination). Alternatively, in order to reliably classify the two-dimensional graph for discrimination Dg from the similar two-dimensional graph Sg, the classifier 28 is retrained with machine learning for arithmetic parameters, and the threshold value is reset. As a result, the accuracy of discrimination can be enhanced.

According to the discrimination device of the present embodiment, the bar graph Bg is displayed. Thus, the user is able to recognize, at a glance, how close the designated area image is to a good product or a defective product, as well as whether the image exhibits a good product or a defective product.

According to the discrimination device of the present embodiment, deep metric learning is used for training the feature extractor 26 and the feature converter 27, and thereby the trained model 35 can be more effectively visualized.

According to the discrimination device of the present embodiment, the feature extractor 26, the feature converter 27, and the classifier 28 are provided as separate configurations. Thus, in order to improve the discrimination accuracy of an object, the training of the feature extractor 26 and the feature converter 27 can be performed separately from the training of the classifier 28. That is, when the low discrimination accuracy is attributed to the low trained accuracy of the feature extractor 26 and the feature converter 27, only the feature extractor 26 and the feature converter 27 are further trained, and when the low discrimination accuracy is attributed to the low classification accuracy of the classifier 28, only the classifier 28 is further trained. As a result, the discrimination accuracy can be efficiently improved. Note that, the visualization of the trained state (individuality) of the trained model 35 facilitates the determination of whether the low discrimination accuracy is attributed to the low classification accuracy of the feature extractor 26 and the feature converter 27 or to the low classification accuracy of the classifier 28.

In the present embodiment, the discriminating device has been described as a device that discriminates whether the object is good or defective, but the present invention is not limited to the configuration. For example, the discrimination device may be applied to a device for discriminating which one of a plurality of classes the object is classified to.

In the present embodiment, the two-dimensional model graph Og and the two-dimensional model graph Ng are displayed in different colors from each other, but the present invention is not limited to the configuration. For example, the two-dimensional model graph Og and the two-dimensional model graph Ng may be displayed in different line types (e.g., solid line and broken line, solid line and one-dot chain line, or solid line and two-dot chain line) or in different line widths.

In the present embodiment, the two-dimensional model graphs Og and Ng are displayed in different colors from those of the two-dimensional graph for discrimination Dg and the selected two-dimensional graph Cg, but the present invention is not limited to the configuration. For example, the two-dimensional model graphs Og and Ng may be displayed in different line types (e.g., solid line and broken line, solid line and one-dot chain line, or solid line and two-dot chain line) or in different line widths from those of the two-dimensional graph for discrimination Dg and the selected two-dimensional graph Cg.

In the present embodiment, the similar two-dimensional graph Sg is displayed in different colors from those of the two-dimensional model graphs Og and Ng, the two-dimensional graph for discrimination Dg and the selected two-dimensional graph Cg, but the present invention is not limited to the configuration. For example, the similar two-dimensional graph Sg may be displayed in a different line type (e.g., solid line and broken line, solid line and one-dot chain line, or solid line and two-dot chain line) or in a different line width from those of the two-dimensional model graphs Og and Ng, the two-dimensional graph for discrimination Dg and the selected two-dimensional graph Cg.

In the present embodiment, the bar graph is used to notify the user of the closeness (similarity) of a designated area image to a good product, but the present invention is not limited to the configuration. For example, changes in tone, sound magnitude, vibration amplitude, vibration cycle, and animation may be used to notify the user of the closeness (similarity) of a designated area image to a good product. When changes in vibration amplitude or vibration cycle are used to notify the user of the closeness (similarity) of a designated area image to a good product, a configuration is possible in which vibration is transmitted to the user's hand through a mouse.

In the present embodiment, the bar graph data 39 is generated based on the minimum distance among the distances between the second multi-dimensional feature vectors 92c of the designated area image data 34c and each of the second multi-dimensional feature vectors 92a of the plurality of the sample image data 34a having instruction signals that are classified as good products in the stage to generate the trained model 35, but the present invention is not limited to the configuration. For example, the bar graph data 39 may be generated based on the average distances between the second multi-dimensional feature vectors 92c of the designated area image data 34c and each of the second multi-dimensional feature vectors 92a of the plurality of the sample image data 34a having instruction signals that are classified as good products in the stage to generate the trained model 35. Alternatively, the bar graph data 39 may be generated based on the minimum distance among the distances between the second multi-dimensional feature vectors 92c of the designated area image data 34c and each of the second multi-dimensional feature vectors 92a of the plurality of the sample image data 34a having instruction signals that are classified as defective products in the state to generate the trained model 35, or based on the average of the distances between the second multi-dimensional feature vectors 92c of the designated area image data 34c and each of the second multi-dimensional feature vectors 92a of the plurality of the sample image data 34a having instruction signals that are classified as defective products in the stage to generate the trained model 35.

In the present embodiment, the second multi-dimensional feature vectors 92a, 92b, 92c are displayed as a two-dimensional graph by plotting and connecting the features f1, f2, f3, . . . , fn−1, and fn by a curve or a straight line on a coordinate system (rectangular coordinate system) with column numbers 1, 2, 3, . . . , n−1, and n on the vertical axis and features f1, f2, f3, . . . , fn−1, and fn on the horizontal axis, but the present invention is not limited to the configuration.

In the present embodiment, the discrimination device includes the feature extractor 26, the feature converter 27, and the classifier 28 as separate configurations, but the classifier 28 may be eliminated from the discrimination device. In this case, for example, a configuration is possible in which an object is classified by the feature extractor 26, the feature converter 27, and the distance calculator 29.

In the present embodiment, a convolutional neural network (CNN) is used as the feature extractor 26, but the present invention is not limited to the configuration. For example, a neural network other than the convolutional neural network (CNN) may be used, or Gradient boosting and so-called statistical machine learning such as support vector machines, random forests, neural networks, gaussian normalization, and ensemble inspection may be used, as the feature extractor 26. When statistical machine learning is used, the multi-dimensional feature vectors are extracted by the statistical machine learning, and then graphed to be visualized, and the classifier 28 for classifying objects is not required.

In the present embodiment, the input device 14 is described as a keyboard and a mouse, but may include a pointing device such as a touch panel, a button, a dial, a touch sensor, a touchpad, and the like.

In the present embodiment, the large-capacity memory for storing various data including image data is the HDD 10, but the present invention is not limited to the configuration. As large-capacity memory for storing various data including image data, a flash memory (e.g., USB memory and SD card), SSD, floppy disk, CD, DVD, or the like may be configured as the large-capacity memory for storing various data.

In the present embodiment, various applications including the visualization program are stored in the HDD 10, but the present invention is not limited to the configuration. For example, various applications including the visualization program may be delivered to the computer 1, which is configured to be a discrimination device according to the present invention, from other computers via a transmission medium, for example, a communication network such as the Internet and LAN.

The present embodiment shows an example of an embodiment for carrying out the present invention. Thus, the present invention is not limited to the configurations of the present embodiment.

REFERENCE SIGNS LIST

1 Computer 1 (Discrimination device)
2 CPU

4 ROM
6 RAM
8 GPU
10 HDD
12 Input/output interface
14 Input device
20 Image display control unit
22 Image acquisition unit
24 Area designation unit
26 Feature extractor (Feature extractor)
27 Feature converter (Feature converter)
27a Fully connected layers (A plurality of fully connected layers)
27b Fully connected layers (A plurality of fully connected layers)
28 Classifier (Classifier)
29 Distance calculator
30 Two-dimensional graph data generation unit (Graph generation unit)
31 Selection unit (Selection unit)
32 Notification unit (Notification unit)
33 Storage unit
34a Sample image data having instruction signal (Sample data)
34b Object image data
34c Designated area image data
35 trained model (trained model)
36a Two-dimensional graph data for mode 1 (First graph data)
36a' Selected two-dimensional graph data (Second graph data)
36b Two-dimensional graph data for discrimination (Second graph data, third graph data)
36c Similar two-dimensional graph data (Fourth graph data)
38 Distance data
39 Bar graph data
60 Display (Display unit)
62 Window (Display unit)
62a First section (First section)
62b Second section (Second section)
62c Third section (Third section)
62d Fourth section (Fourth section)
80 Bus
82 Bus line
90a First multi-dimensional feature vectors (First multi-dimensional feature vectors)
90b First multi-dimensional feature vectors (Third multi-dimensional feature vectors)
90c First multi-dimensional feature vectors (Fifth multi-dimensional feature vectors)
92a Second multi-dimensional feature vectors (Second multi-dimensional feature vectors)
92a' Minimum distance second multi-dimensional feature vectors
92b Second multi-dimensional feature vectors (Fourth multi-dimensional feature vectors)
92c Second multi-dimensional feature vectors (Sixth multi-dimensional feature vectors)
fn Features (Features)
n Number of column
Og Two-dimensional graphs for model of good products (A plurality of graphs)
Ng Two-dimensional graphs for model of defective products (A plurality of graphs)
Sg Similar two-dimensional graph (Graph similar to graph of Sixth multi-dimensional feature vectors)
Bg Bar graph
Dg Two-dimensional graph for discrimination (Graph of fourth multi-dimensional feature vectors, graph of sixth multi-dimensional feature vectors)
Cg Selected two-dimensional graph (Graph of fourth multi-dimensional feature vectors)

The invention claimed is:

1. A visualization method for visualizing a trained state of a model that has been trained with a plurality of sample data, the method including:
(a) in order to generate the trained model, extracting first multi-dimensional feature vectors of each of the plurality of sample data by a feature extractor;
(b) converting the extracted first multi-dimensional feature vectors to second multi-dimensional feature vectors of a lower dimension than the first multi-dimensional feature vectors by a feature converter that uses a plurality of fully connected layers;
(c) graphing the converted second multi-dimensional feature vectors of each of the plurality of sample data; and
(d) displaying a plurality of generated graphs in a first section of a display unit.

2. The visualization method according to claim 1, wherein in the step (d), in the plurality of graphs, identical or similar graphs are displayed in an identical or similar style to each other, and dissimilar graphs are displayed in different styles from each other.

3. The visualization method according to claim 1, wherein in the step (c), the second multi-dimensional feature vectors are plotted into a two-dimensional graph as a set of features for the number of dimensions.

4. The visualization method according to claim 1, wherein in the step (a), in order to classify an object, third multi-dimensional feature vectors of the object are extracted by the feature extractor,
the step (b) includes a step of converting the extracted third multi-dimensional feature vectors into fourth multi-dimensional feature vectors of a lower dimension than the third multi-dimensional feature vectors by the feature converter,
the step (c) includes a step of graphing the fourth multi-dimensional feature vectors, and
the step (d) includes a step of displaying a graph of the fourth multi-dimensional feature vectors, in the first section, in a style different from the styles of the plurality of graphs.

5. The visualization method according to claim 4, wherein in the step (c), the fourth multi-dimensional feature vectors are plotted into a two-dimensional graph as a set of features for the number of dimensions.

6. The visualization method according to claim 4, further comprising the steps of:
(e) displaying an image of the object in a second section of the display unit; and
(f) designating an area of the image of the object,
wherein the step (a) includes a step of extracting fifth multi-dimensional feature vectors in the designated area by the feature extractor,
the step (b) includes a step of converting the extracted fifth multi-dimensional feature vectors into sixth multi-dimensional feature vectors of a lower dimension than the fifth multi-dimensional feature vectors by the feature converter,
the step (c) includes a step of graphing the sixth multi-dimensional feature vectors, and the step (d) includes a step of displaying a graph of the sixth multi-dimensional feature vectors, in the first section, in a style different from the styles of the plurality of graphs.

7. The visualization method according to claim 6, further comprising the steps of:
(g) selecting a graph similar to the graph of the sixth multi-dimensional feature vectors out of the plurality of graphs,
wherein the step (d) includes a step of displaying, in the first section, the graph similar to the graph of the sixth multi-dimensional feature vectors in the plurality of graphs, in a style different from the styles of the plurality of graphs and the graph of the sixth multi-dimensional feature vectors.

8. The visualization method according to claim 6, further comprising the steps of:
(h) setting a reference value based on the predetermined second multi-dimensional feature vectors;
(i) calculating the differences between the sixth multi-dimensional feature vectors and the reference value as one-dimensional numerical values; and
(j) notifying of the calculated differences in a visual and/or auditory and/or tactile mode.

9. The visualization method according to claim 6, wherein in the step (c), the sixth multi-dimensional feature vectors are plotted into a two-dimensional graph as a set of features for the number of dimensions.

10. The visualization method according to claim 1, wherein
the feature extractor and the feature converter are trained with a neural network that includes deep learning.

11. The visualization method according to claim 10, wherein
the feature extractor and the feature converter are trained with deep metric learning.

12. A visualization device for visualizing the trained state of a model that has been trained with a plurality of sample data, the visualization device comprising:
a feature extractor configured to extract first multi-dimensional feature vectors of each of the plurality of sample data in order to generate the trained model;
a feature converter configured to convert the extracted first multi-dimensional feature vectors to second multi-dimensional feature vectors of a lower dimension than the first multi-dimensional feature vectors by using a plurality of fully connected layers;
a graph generation unit configured to generate a plurality of first graph data for graphing the second multi-dimensional feature vectors of each of the plurality of converted sample data; and
a display unit including a first section for displaying a plurality of graphs based on the plurality of generated first graph data.

13. The visualization device according to claim 12, wherein
the graph generation unit generates two-dimensional graph data by using the second multi-dimensional feature vectors as a set of features for the number of dimensions.

14. The visualization device according to claim 12, wherein
the graph generation unit adds first identical or similar identification information to the data identical or similar to each other in the plurality of first graph data, and the display unit displays the plurality of graphs, in the first section, based on the plurality of first graph data having the first identification information.

15. The visualization device according to claim 14, wherein
in order to classify an object, the feature extractor extracts third multi-dimensional feature vectors of the object,
the feature converter converts the extracted third multi-dimensional feature vectors into fourth multi-dimensional feature vectors of a lower dimension than the third multi-dimensional feature vectors,
the graph generation unit generates second graph data for graphing the fourth multi-dimensional feature vectors, and adds second identification information to the second graph data, the second identification information being different from the first identification information, and
the display unit displays a graph of the fourth multi-dimensional feature vectors, in the first section, based on the second graph data having the second identification information.

16. The visualization device according to claim 15, wherein
the graph generation unit generates two-dimensional graph data by using the fourth multi-dimensional feature vectors as a set of features for the number of dimensions.

17. The visualization device according to claim 15, wherein
the display unit includes a second section for displaying an image of the object and is configured to designate an area of the image of the object in the second section,
the feature extractor extracts fifth multi-dimensional feature vectors in the designated area,
the feature converter converts the extracted fifth multi-dimensional feature vectors into sixth multi-dimensional feature vectors of a lower dimension than the fifth multi-dimensional feature vectors,
the graph generation unit generates third graph data for graphing the sixth multi-dimensional feature vectors, and adds third identification information to the third graph data, the third identification information being different from the first identification information, and
the display unit displays a graph of the sixth multi-dimensional feature vectors, in the first section, based on the third graph data having the third identification information.

18. The visualization device according to claim 17, further comprising:
a selection unit configured to select fourth graph data similar to the third graph data from the plurality of first graph data, and add fourth identification information to the selected fourth graph data, the fourth identification information being different from the first and second identification information,
wherein the display unit displays a graph similar to the graph of the sixth multi-dimensional feature vectors, in the first section, based on the fourth graph data having the fourth identification information.

19. The visualization device according to claim 17, further comprising:
a notification unit configured to set a reference value based on the predetermined second multi-dimensional feature vectors, calculate the differences between the sixth multi-dimensional feature vectors and the reference value as one-dimensional numerical values, and notify of the calculated differences in a visual and/or auditory and/or tactile mode.

20. The visualization device according to claim 17, wherein
the graph generation unit generates two-dimensional graph data by using the sixth multi-dimensional feature vectors as a set of features for the number of dimensions.

21. A discrimination device configured to discriminate the class of an object, the discrimination device comprising: the visualization device according to claim 15, and
a classifier that uses statistical machine training for classifying the plurality of sample data based on the second multi-dimensional feature vectors; wherein
the classifier classifies the object based on the second multi-dimensional feature vectors of each of the plurality of classified sample data and the fourth multi-dimensional feature vectors.

22. A discrimination device configured to discriminate the class of an object, the discrimination device comprising: the visualization device according to claim 17, and
a classifier that uses statistical machine training for classifying the plurality of sample data based on the second multi-dimensional feature vectors; wherein
the classifier classifies the area based on the second multi-dimensional feature vectors of each of the plurality of classified sample data and the sixth multi-dimensional feature vectors.

23. The visualization device according to claim 12, wherein
the feature extractor and the feature converter are trained with a neural network that includes deep learning.

24. The visualization device according to claim 23, wherein
the feature extractor and the feature converter are trained with deep metric learning.

25. A discrimination device configured to discriminate the class of an object, the discrimination device comprising:
the visualization device according to claim 13; and
a classifier that uses statistical machine training for classifying the plurality of sample data based on the second multi-dimensional feature vectors.

* * * * *